US012519244B2

(12) United States Patent
Alexanian et al.

(10) Patent No.: US 12,519,244 B2
(45) Date of Patent: Jan. 6, 2026

(54) SLOT ARRAY ANTENNAE WITH PROTRUSIONS

(71) Applicant: Magna Electronics, LLC, Southfield, MI (US)

(72) Inventors: Angelos Alexanian, Lexington, MA (US); Konstantinos Konstantinidis, Schweinfurt (DE); Scott B. Doyle, Sudbury, MA (US); Nikolay Chistyakov, Nashua, NH (US)

(73) Assignee: Magna Electronics, LLC, Southfield, MI (US)

( * ) Notice: Subject to any disclaimer, the term of this patent is extended or adjusted under 35 U.S.C. 154(b) by 141 days.

(21) Appl. No.: 18/388,177

(22) Filed: Nov. 8, 2023

(65) Prior Publication Data

US 2024/0079789 A1 Mar. 7, 2024

Related U.S. Application Data

(63) Continuation of application No. 17/206,599, filed on Mar. 19, 2021, now Pat. No. 11,855,346.

(51) Int. Cl.

| | |
|---|---|
| ***H01Q 13/10*** | (2006.01) |
| ***G01S 13/931*** | (2020.01) |
| ***H01Q 1/32*** | (2006.01) |
| ***H01Q 21/00*** | (2006.01) |

(52) U.S. Cl.

CPC ........... *H01Q 13/10* (2013.01); *G01S 13/931* (2013.01); *H01Q 1/325* (2013.01); *H01Q 21/005* (2013.01)

(58) Field of Classification Search

None

See application file for complete search history.

(56) References Cited

U.S. PATENT DOCUMENTS

| | | | | |
|---|---|---|---|---|
| 3,078,463 A * | 2/1963 | Lamy | H01Q 25/004 | 333/113 |
| 3,570,007 A * | 3/1971 | Whitehead | H01Q 25/00 | 343/771 |
| 3,599,216 A * | 8/1971 | Paine | H01Q 21/24 | 343/771 |

(Continued)

OTHER PUBLICATIONS

International Search Report for PCT/US2022/020834; European Patent Office; Rijswijk, The Netherlands; completed Oct. 28, 2022; mailed Jan. 22, 2023. (Year: 2023).*

(Continued)

*Primary Examiner* — Bernarr E Gregory

(74) *Attorney, Agent, or Firm* — Matthew D. Thayne; Thayne and Davis LLC

(57) ABSTRACT

Antenna structures and assemblies for use in RADAR sensor assemblies and the like. In some embodiments, the assembly may comprise a plurality of elongated radiating slots formed in a first array, which may extend parallel, or at least substantially parallel, to each another within the first array. The assembly may further comprise a plurality of elongated protrusions formed in a second array, which may extend parallel, or at least substantially parallel, to each another within the second array. In some embodiments, each radiating slot within the first array may similarly extend parallel, or at least substantially parallel, to each elongated protrusion within the second array.

19 Claims, 19 Drawing Sheets

(56) References Cited

U.S. PATENT DOCUMENTS

| | | | | | |
|---|---|---|---|---|---|
| 4,429,313 | A * | 1/1984 | Muhs, Jr. | H01Q 21/005 | |
| | | | | 343/771 | |
| 5,010,351 | A * | 4/1991 | Kelly | H01Q 21/005 | |
| | | | | 343/771 | |
| 5,650,793 | A * | 7/1997 | Park | H01Q 21/005 | |
| | | | | 333/116 | |
| 5,955,998 | A * | 9/1999 | Roberts | H01Q 13/10 | |
| | | | | 343/768 | |
| 2015/0123862 | A1* | 5/2015 | Milroy | H01Q 19/138 | |
| | | | | 343/780 | |
| 2017/0207543 | A1* | 7/2017 | Kirino | H01Q 21/064 | |
| 2020/0212594 | A1* | 7/2020 | Kirino | H01Q 21/064 | |
| 2020/0287293 | A1* | 9/2020 | Shi | H01Q 21/005 | |

OTHER PUBLICATIONS

Written Opinion of the International Searching Authority for PCT/US2022/020834; European Patent Office; Rijswijk, The Netherlands; completed Oct. 28, 2022; mailed Jan. 22, 2023. (Year: 2023).*

P. Delos et al., "Phased Array Antenna Patterns—Part 2: Grating Lobes and Beam Squint"; posted on the internet at npdigest.com; Oct. 2020 issue; pp. 2-5; published by Analog Devices, Inc.; Wilmington, Massachusetts, USA. (Year: 2020).*

* cited by examiner

SLOT ARRAY ANTENNAE WITH PROTRUSIONS

CROSS-REFERENCE TO RELATED APPLICATIONS

This application is a continuation of co-pending application Ser. No. 17/206,599 filed on Mar. 19, 2021, and titled "PARALLEL PLATE SLOT ARRAY ANTENNA WITH DEFINED BEAM SQUINT," now U.S. Pat. No. 11,855,346, which is hereby incorporated herein by reference in its entirety.

SUMMARY

Disclosed herein are various embodiments of antenna assemblies. In preferred embodiments, such assemblies, or any of the individual structures/features of such assemblies, may be used in RADAR or other sensor modules for vehicles.

Antennas are often designed to have the radiation pattern with the beam pointing at the boresight direction, which is typically the direction perpendicular to the plane bearing the radiating elements. It is also commonly desired that the deviation of the main beam of the radiation pattern from the boresight, called the squint, should be minimal. By contrast with antennas pointing at the boresight direction, some of the antennas disclosed herein are purposely designed to have a squint. Generally, the disclosed antenna is pointing away from the boresight and the boresight direction is considered as a special case of a zero squint. However, some of the assemblies disclosed herein comprise novel features for boresight antennas.

Antennas designed to have a predetermined angle of squint can be useful when aligning the antenna beam with a preferred direction by means of mechanical rotation of the antenna body is impossible or undesirable. Alternatively, a squint can be tolerated as being a result of a trade-off with other antenna parameters (gain, side lobes, etc.) and if the aligning of the beam direction by mechanical rotation is possible.

In automotive RADAR sensors, which typically operate in the frequency band from 76 GHz to 81 GHz, antennas with a squinted beam, e.g., 45 degrees, can be used as a side-looking antenna for detecting vehicles or other objects within the adjacent lane. Depending on the specific application, the desired squint angle can be different and may range from 0 degrees to 90 degrees in certain embodiments.

In preferred embodiments, the antennas disclosed herein utilize a waveguide fed, parallel-plate slot array structure. Aspects of the present disclosure may be particularly useful for mm-wave antennas and can be used in various applications including, but not limited to, automotive RADAR sensors. Some such embodiments may have one or more features specifically configured to provide one or more targeted squint angles for the corresponding radiation pattern.

In a more particular example of an antenna, such as an antenna for a RADAR or other vehicle sensor module, the antenna may comprise a feed waveguide comprising one or more feeding slots and a parallel plate waveguide operably coupled with the feed waveguide such that each of the one or more feeding slots of the feed waveguide is configured to inject electromagnetic energy into the parallel plate waveguide. A plurality of radiating slots may be formed in an array and/or in a plurality of rows and/or columns extending away from the feed waveguide to deliver electromagnetic energy out of the antenna assembly.

In some embodiments, the antenna assembly may be configured to deliver the electromagnetic energy from the antenna assembly with a predetermined beam squint at one or more predetermined angles from a boresight direction of the parallel plate waveguide.

In some embodiments, each of the plurality of columns of radiating slots may be shifted relative to an adjacent column of radiating slots.

Some embodiments may further comprise a plurality of protrusions formed on a surface of the parallel plate waveguide opposing the plurality of radiating slots. In some such embodiments, each of the plurality of protrusions may be elongated. Each of the plurality of radiating slots may also, in some embodiments, be elongated in a shape that is identical to, or at least substantially matching, a cross-sectional shape of each of the plurality of protrusions (or at least a subset).

In some embodiments, the parallel plate waveguide may be defined by an antenna body and a cover plate coupled to the antenna body. In some such embodiments, the parallel plate waveguide may be further defined by a sidewall piece positioned between the antenna body and the cover plate. This sidewall piece may define sidewalls for the parallel plate waveguide to prevent or at least inhibit leakage of electromagnetic energy from the parallel plate waveguide. Alternatively, sidewalls may extend from one of the other layers/components of the assembly.

In some embodiments, at least a portion of the parallel plate waveguide is defined by a printed circuit board. For example, in some embodiments, a printed circuit board may form one layer and/or surface of the waveguide.

In an example of a vehicle antenna assembly according to some embodiments, the assembly may comprise an antenna body comprising a feed waveguide defined by the antenna body and extending along an elongated axis. The feed waveguide may be formed by opposing rows of adjacent posts defining the feed waveguide therebetween, or by opposing solid sidewalls. The assembly may further comprise one or more feeding slots extending into the feed waveguide and a cover plate coupled to the antenna body to define a parallel plate waveguide between the cover plate and a surface of the antenna body into which the one or more feeding slots are positioned. A plurality of radiating slots may be formed in a plurality of columns and/or rows. Each (or, at least a subset) of the plurality of columns/rows may extend in a direction at least substantially perpendicular to the elongated axis of the feed waveguide. One or more of the walls of the feed waveguide and/or the parallel plate waveguide may, in some embodiments, be defined by a series of spaced, adjacent, posts rather than solid walls.

Some embodiments may further comprise a plurality of sidewalls extending between the antenna body and the cover plate to define a height of the parallel plate waveguide. In some such embodiments, each of the plurality of sidewalls may be defined by a sidewall piece positioned between the antenna body and the cover plate. Alternatively, each of the plurality of sidewalls may integrally extend from the cover plate as part of the cover plate.

Some embodiments may further comprise a plurality of elongated protrusions extending from a surface of the antenna body opposing the plurality of radiating slots. In some such embodiments, each (or each of at least a subset) of the plurality of elongated protrusions may be positioned below a corresponding radiating slot.

In an example of a vehicle sensor assembly according to some embodiments, the assembly may comprise a first waveguide defined within a first layer of an antenna body and a second waveguide at least partially defined by the first layer. One or more elongated feeding slots may extend along an axis of the first waveguide and may be configured to deliver electromagnetic energy from the first waveguide to the second waveguide. A plurality of elongated protrusions may be formed along a surface of the antenna body at least partially defining the second waveguide. A plurality of radiating slots may be formed in the antenna body and may be configured to deliver electromagnetic radiation outside of the antenna body from the second waveguide.

In some embodiments, the antenna body may comprise a first side, a second side opposite the first side, a third side, and a fourth side opposite the third side. The first waveguide may extend at least substantially an entire distance between the first side of the antenna body and the second side of the antenna body and may be confined to a narrow region of the antenna body between the third side and the fourth side. The narrow region preferably comprises less than one half of the width of the antenna body defined between the third side and the fourth side. In some embodiments, the narrow region comprises less than one-fourth of the width of the antenna body defined between the third side and the fourth side. In some embodiments, the first waveguide is positioned adjacent to the third side.

The plurality of elongated protrusions may be formed in a plurality of columns and/or rows similar to the radiating slots. In some embodiments, the plurality of radiating slots may be formed in a plurality of rows and/or columns, wherein a number of rows and/or columns of the elongated protrusions may be equal to a number of rows and/or columns of the radiating slots. In some embodiments, the number of radiating slots may be equal to the number of elongated protrusions.

In some embodiments, each (or, alternatively, at least a subset) of the elongated protrusions is aligned with a corresponding radiating slot.

In some embodiments, the vehicle sensor assembly may be configured to deliver electromagnetic energy from the plurality of radiating slots with a predetermined beam squint, which may be measured as a non-zero angle from the boresight direction in some cases.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
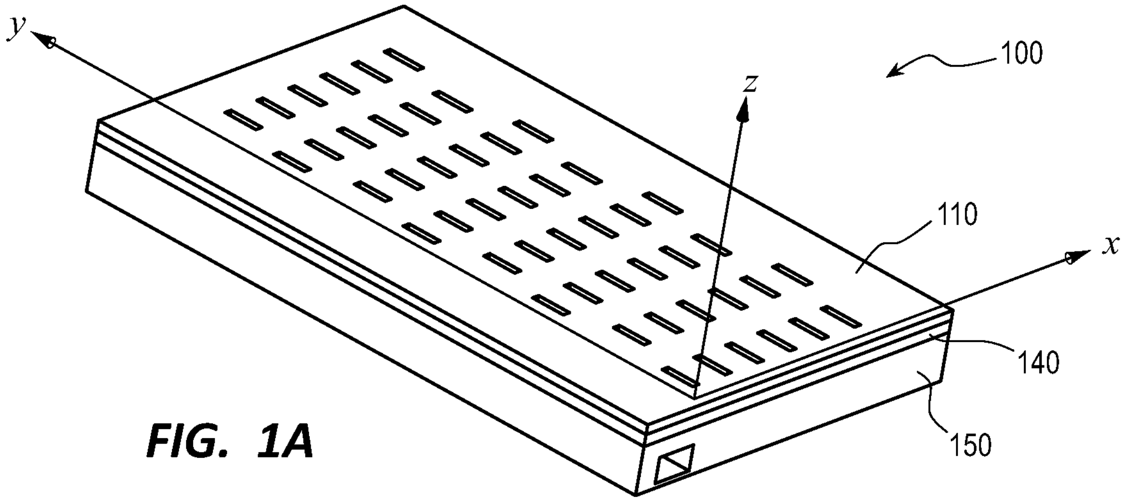
FIG. 1A is a perspective view of an antenna assembly according to some embodiments.
Figure 1B:
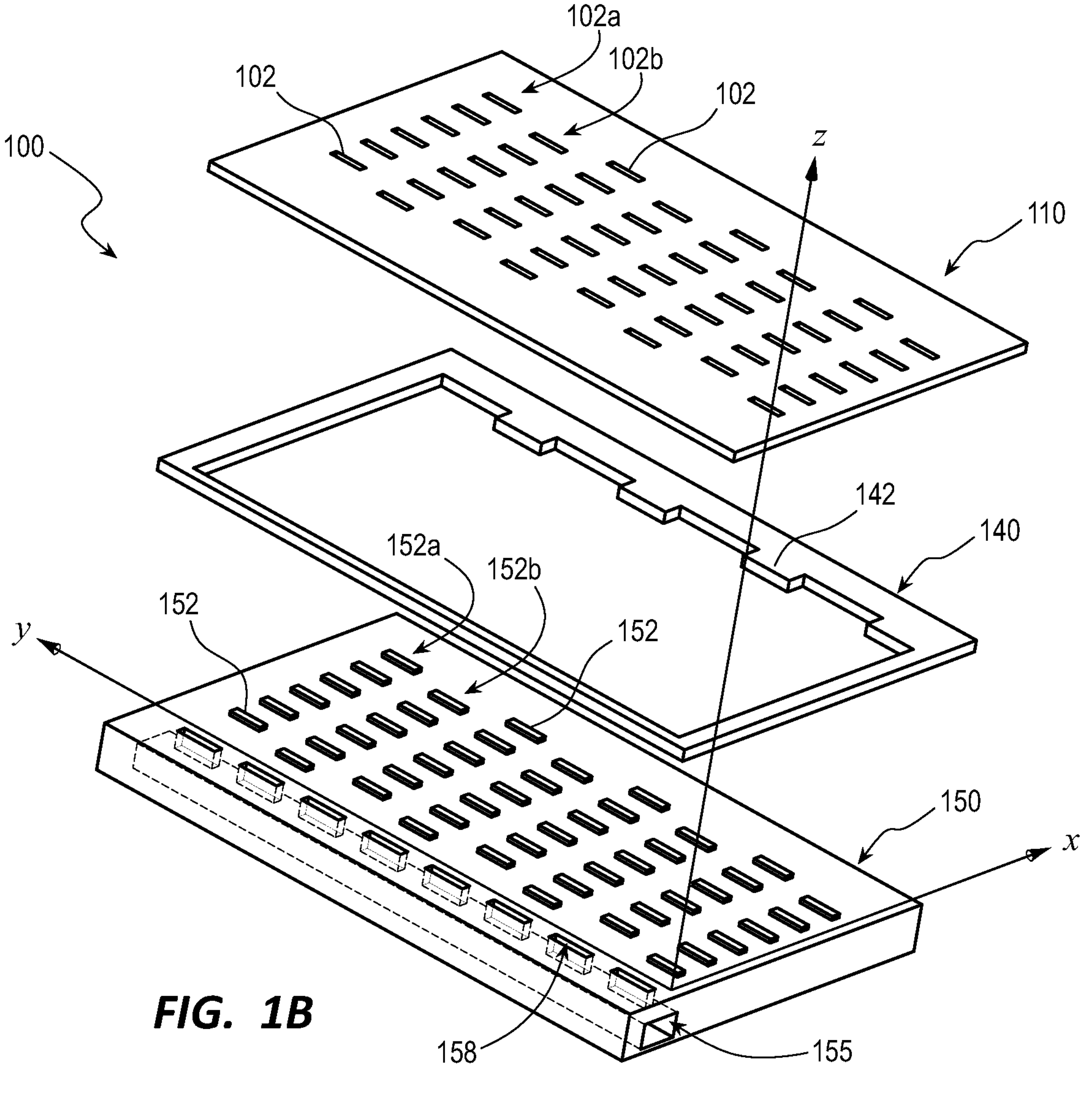
FIG. 1B is an exploded, perspective view of the antenna assembly of FIG. 1A.

FIGS. 1A and 1B depict an antenna assembly 100, such as a RADAR antenna assembly for a vehicle, for example, according to some embodiments. Assembly 100 is shown comprising three layers, namely, an antenna body 150, which may, in some embodiments, comprise a casting, such as a casting comprising a Zinc or other suitable preferably metal material. However, in other contemplated embodiments, antenna body 150 may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with antenna body/block 150. For example, although the preferred embodiments disclosed herein comprise slots 102 that are formed in a separate layer, namely, cover 110, it is contemplated that, in other embodiments, slots may be instead formed directly within antenna body 150. Thus, although three layers are shown in the depicted embodiment of FIGS. 1A and 1B, various other numbers of layers may be used in functionally equivalent embodiments as desired. In addition, some elements of a complete RADAR or other sensor module/assembly are not depicted herein to avoid obscuring the disclosure.

As best shown in the exploded view of FIG. 1B, assembly 100 comprises an array of radiating slots 102 formed in cover 110. This array is formed into parallel columns that are offset from one another. Thus, column 102*a* comprises slots that are positioned adjacent to spaces in between adjacent slots 102 in column 102*b*. The pattern of alternative/offset columns may repeat throughout the array such that, as shown in FIG. 1B, slots from the array just to the right of column 102*b* may be aligned with the slots from column 102*a*, and so on. As described below, however, it is contemplated that, in other embodiments, the array of slots 102 may comprise columns and/or rows that are aligned with one another rather than offset with respect to adjacent columns and/or rows, as shown in FIG. 1B.

Antenna body 150 comprises a plurality of protrusions 152. Protrusions 152 may be used to control the excitation of the radiating slots 102 located above them. More specifically, they may allow for controlling of the amplitude and phase of the radiating slots excitation.

Protrusions 152 are, like slots 102, formed in an array having offset columns. Thus, column 152*a* of protrusions 152 is offset from adjacent column 152*b*, and so on. In preferred embodiments, protrusions 152 may have one or more parameters that correlate with slots 102. Thus, for example, preferably, protrusions 152 have the same shape, a substantially identical shape, or at least a similar shape. Thus, in the depicted embodiment, protrusions 152 have an elongated, rectangular shape that matches that of slots 102. However, it is contemplated that one or both of protrusions 152 and slots 102 may have other shapes, such as elliptical, trapezoidal, oblong, or the like. Preferably, however, one or both of slots 102 and protrusions 152 are elongated in one direction to provide an identifiable elongated axis. Thus, it may be preferred to avoid circular shapes, for example.

It may also be preferred that the protrusions 152 have the same or a similar size with respect to the slots 102. Thus, although it may be preferred that they have the same, or at least substantially the same size (within about ±15% of one or more dimensions such as length, width, and/or area/footprint). However, it is contemplated that, in some embodiments, one or more of the length, width, and area of the protrusions 152 may be between about 50% and about 150% of the corresponding length, width, and/or area of the slots 102.

As another preferred matching parameter, preferably, most or all of protrusions 152 are positioned directly, or at least substantially directly, under a corresponding slot 102. However, it is contemplated that, in some embodiments, the positioning of each protrusion 152 may be shifted slightly (preferably less than about 0.5 mm in automotive applications; for other applications, such as applications using radiation at a frequency of around 30 GHz, for example, the shifting may be 1 mm or more) relative to one or more (in some cases, each) corresponding slot 102. In addition, although it may be preferred to have an equal number of protrusions 152 as slots 102, it is contemplated that some protrusions 152 may be omitted. Moreover, in some embodiments, protrusions 152 may be omitted altogether. However, when present, preferably sufficient numbers of protrusions 152 are formed such that there is an equal number of columns and/or rows of protrusions 152 as columns and/or rows of slots 102.

Preferably, when present, protrusions 152 are between about 0.1 mm and about 0.4 mm in height for automotive applications operating in the frequency range of 76-81 GHz. However, as those of ordinary skill in the art will appreciate, the height of the protrusions 152 may vary in accordance with the frequency of the electromagnetic radiation being used. The height used may also vary depending upon the desired use of the antenna, since the height of the protrusions 152 may be used as a parameter to control the amplitude and/or phase of the excitation of the radiating slots 102 and/or may be used to direct a squint of a main lobe of the antenna, the shape of the main lobe, and/or the level of side lobes and/or the grating lobe. The preferred sizes of the protrusions 152 may be identified using 3-D simulation software, such as HFSS, and may be selected among results of various simulations or using an optimization procedure. For example, the present inventors have discovered that, in the embodiment shown of FIGS. 1A and 1B, the squint angle is about 45 degrees and the frequency is 77 GHz), the sizes of the protrusions 152 are about 1.8 mm×0.5 mm×0.2 mm (0.2 mm being the height). However, again, particularly for small squint angles and/or directions close to the boresight, protrusions may be unnecessary. Although the top surfaces of the protrusions 152 are shown as flat in the depicted embodiments, it is also contemplated that, in alternative embodiments, these top surfaces may be pointed, sloped, roughened, or otherwise non-flat.

The desired sizes of the radiating slots 102 may be found using, for example, 3-D simulation software. Although the locations of the slots 102 are preferably synchronized with the locations of the protrusions 152 such that they are aligned with one another, the slot-to-slot distance (as well as the protrusion-to-protrusion distance) in the x direction is preferably constant (although may be non-uniform in other contemplated embodiments, which may provide for another degree of freedom to shape the desired radiation pattern) and may vary from about one-fourth to about a full wavelength of the parallel-plate waveguide wavelength. This distance may effectively impact the squint angle and may therefore be a prime design parameter determining the squint value. The slot-to-slot distance (as well as the protrusion-to-protrusion distance) in the other direction (y direction in the figures) is also preferably constant and may be, for example, about a half wavelength of the wave propagating in the internal waveguide 155 described below.

Antenna body 150 further comprises a self-contained, feed waveguide 155, which may be formed within a tunnel 155 formed within body 150. A series of feed slots 158 are formed along waveguide 155 to allow electromagnetic energy to be introduced from waveguide 155 into a parallel plate waveguide formed between upper surface of antenna body 150 and lower surface of cover 110. Feed slots 158 are arranged in a straight line and preferably extend along waveguide 155 at a positioned near, but not precisely along, the center of waveguide 155 (between opposing walls extending along the elongated axis of waveguide 155).

It should be understood that, although in the preferred embodiment depicted, feed waveguide 155 is formed as a tunnel extending within a solid waveguide body structure, various alternative embodiments are contemplated. For example, as one alternative, feed waveguide 155 may be formed by coupling two separate layers together. In such embodiments, one of the layers may wholly form feed waveguide 155 and the other layer may contain feed slots 158, or any of the other waveguide feed structures disclosed herein or otherwise available to those of ordinary skill in the art. Alternatively, each layer of the aforementioned layered structure may partially form the feed waveguide 155. Similarly, feed waveguide 155 may be formed by opposing rows of posts rather than solid walls in other alternative embodiments. In addition, with respect to this and any of the other embodiments disclosed herein, a PCB may form a layer, such as the bottom layer, of the waveguide, if desired.

In the depicted embodiments, the number of feed slots 158 is equal to the number of columns of protrusions 152 and the number of columns of radiating slots 102. However, as will be apparent from a review of all embodiments disclosed herein, this need not be the case for all contemplated embodiments. In addition, the size/footprint of feed slots may be identical, or at least substantially identical, to that of the protrusions 152 and/or radiating slots 102, but this need not always be the case either.

As shown in FIG. 1B, it is also preferred that waveguide 155 is positioned adjacent to a peripheral edge of antenna body 150 rather than at or near the center. Although there are embodiments contemplated in which the internal waveguide 155 is not positioned adjacent to an outer edge of antenna body 150, it is thought that some of the parameters of assembly 100 may need to be adjusted if this modification is made.

Finally, it may be preferred to have all of the protrusions 152 and/or radiating slots 102 positioned on one side of the feed slots 158, as shown in FIG. 1B. However, it is contemplated that, in some embodiments, one or more protrusions 152 and/or radiating slots 102 may instead be positioned on the opposite side of feed slots 158 and/or waveguide 155. However, it is preferably that at least most of the radiating slots 102 and, when present, protrusions 152, are positioned on one side of waveguide 155 and/or feed slots 158, which may be facilitated by placement of waveguide 155 adjacent to a peripheral edge, as previously mentioned. Thus, in preferred embodiments, at least 90% of the radiating slots 102 and/or protrusions 152 are positioned on just one side (in the x direction in FIG. 1B) of waveguide 155 and feed slots 158.

In order to provide sidewalls for the parallel-plate waveguide defined in between antenna body 150 and cover 110, a sidewall piece 140 may be provided. Sidewall piece 140 preferably comprises a full perimeter having an open center to allow for a space for confinement of electromagnetic energy between the upper surface of antenna body 150 and the lower surface of cover plate 110 without allowing EM leakage through the sides of the waveguide. However, it is contemplated that, in alternative embodiments, these sidewalls may be an integral part of another layer/piece of the assembly. For example, the parallel plate waveguide may have sidewalls that extend integrally from cover 110 and/or from antenna body 150 rather than providing a separate layer for these sidewalls. It is also contemplated that sidewalls, or any of the other waveguide structures described herein, may be formed using a series of adjacent posts rather than continuous walls in alternative embodiments. Indeed, any of the sidewalls of the various waveguide structures disclosed herein may be formed using adjacent posts rather than continuous sidewalls in alternative embodiments. Similarly, any of the structures described as being formed from rows of adjacent posts may be replaced with continuous walls.

In the depicted embodiment, sidewall piece 140 comprises a series of sidewall protrusions 142. Sidewall protrusions 142 are optional but the present inventors have discovered that they may improve performance for certain types of applications. As shown in FIG. 1B, sidewall protrusions 142 may be used to equalize the distance between the adjacent sidewall of the parallel-plate waveguide and the adjacent pair of radiating slot 102 and vertical protrusion 152. Thus, each sidewall protrusion 142—which are elongated rectangular protrusions in the depicted embodiment but need not be in all contemplate embodiments-extend into an adjacent column of corresponding slots 102/protrusions 152 that is set further away from the outer edge of the assembly 100 than the adjacent columns. Again, this allows the distance from each outermost slot 102 and/or protrusion 152 to be equal, or at least substantially equal, to an adjacent parallel plate sidewall.

In preferred embodiments, the height of the sidewalls of the parallel plate waveguide created by sidewall piece 140 is between about 0.5 mm and about 1 mm. Although it is contemplated that this dimension may vary from the preferred range, it is thought that this range provide the most utility for automotive RADAR applications.

Figure 2A:
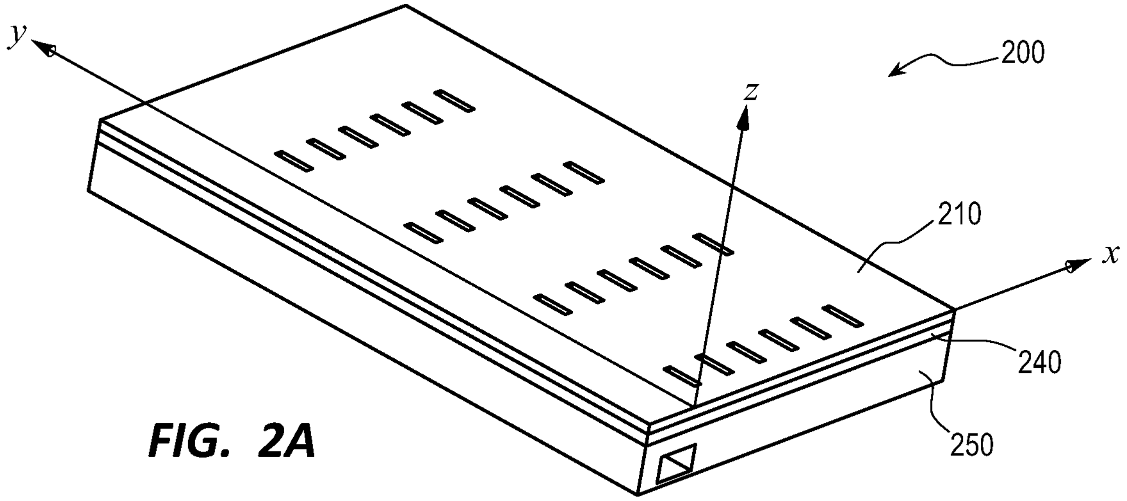
FIG. 2A is a perspective view of an antenna assembly according to other embodiments.
Figure 2B:
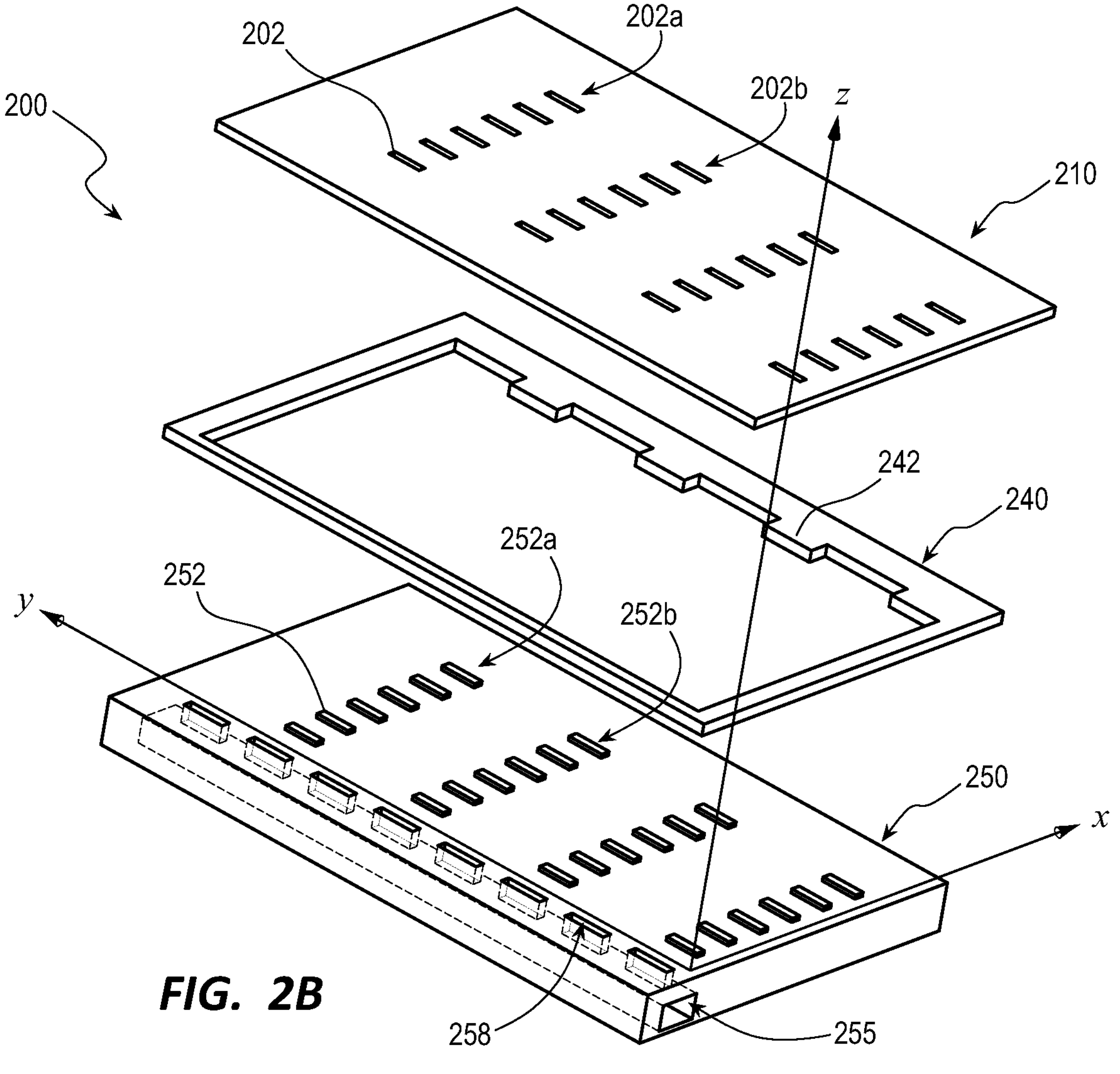
FIG. 2B is an exploded, perspective view of the antenna assembly of FIG. 2A.

FIGS. 2A and 2B depict another example of an antenna assembly 200 according to some embodiments. Antenna assembly 200 again comprises three layers-namely, an antenna body 250 and a cover plate 210 defining a parallel plate waveguide therebetween and a sidewall piece 240 positioned therebetween to define sidewalls for the parallel plate waveguide. The sidewall piece 240 again comprises a plurality of sidewall protrusions 242. It is contemplated that this embodiment may be useful in connection with multi-beam antennas. Alternatively, this embodiment can be considered a partial reproduction of a complete antenna that may be more readily usable in the automotive industry for RADAR sensing. In particular, it is contemplated that a complete antenna may include the arrays of vertical protrusions and radiating slots arrays of these figures along with those of the embodiment of FIGS. 3A and 3B.

In addition, antenna body 250 again comprises an elongated slot or tunnel extending adjacent to one side thereof to define a self-contained waveguide 255 therein. A series of feed slots 258 arranged in a row are positioned along waveguide 255 to facilitate introduction of electromagnetic energy into the parallel plate waveguide.

Antenna assembly 200, however, differs from assembly 100 in that the columns of vertical protrusions 252 and corresponding radiating slots 202 are not staggered. More particularly, the staggered columns of radiating slots and vertical protrusions from antenna assembly 100 have been removed. A sidewall protrusion 242 is aligned with each column of radiating slots 202 and vertical protrusions 252. Thus, the leftmost sidewall protrusion 242 is aligned with column 202*a* of radiating slots 202 and column 252*a* of protrusions 252. The adjacent protrusion 242 is aligned with column 202*b* of radiating slots 202 and column 252*b* of protrusions 252, and so on.

The various parameters of each of these elements may vary as previously described. For example, although the number, size, and placement of slots 202 is matched identically with protrusions 252, one or more of these parameters may vary as previously described in connection with assembly 100.

Figure 3A:
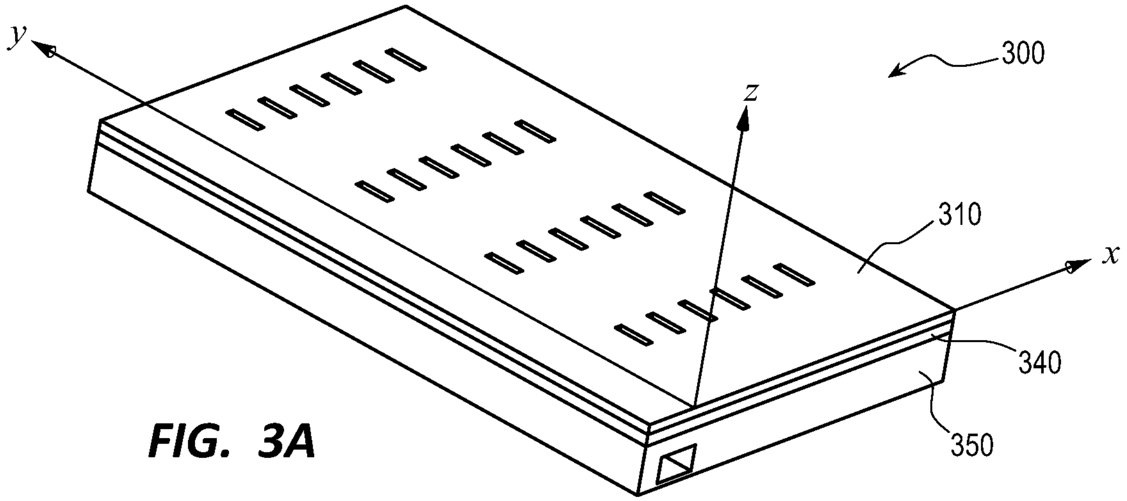
FIG. 3A is a perspective view of an antenna assembly according to still other embodiments.
Figure 3B:
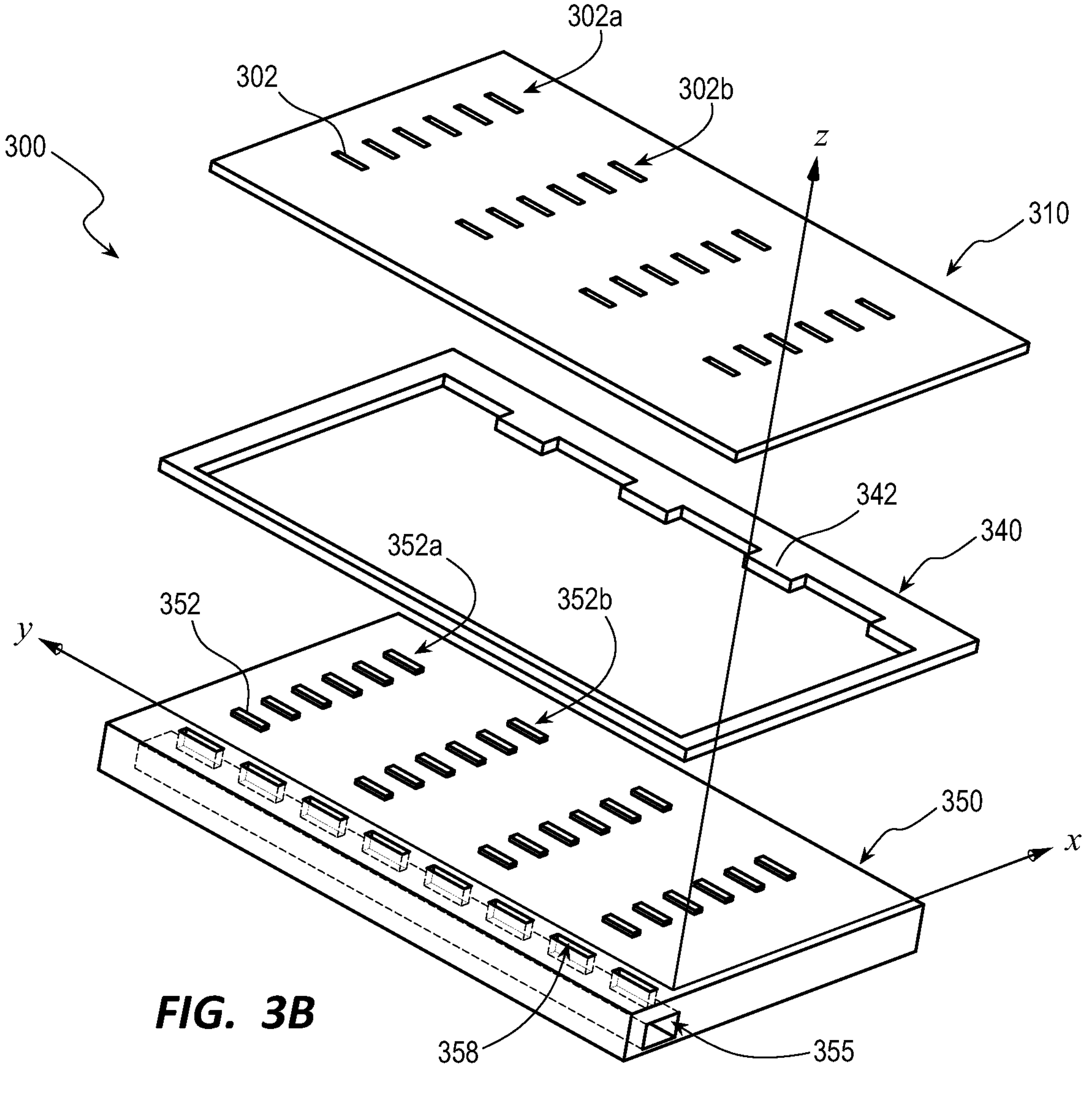
FIG. 3B is an exploded, perspective view of the antenna assembly of FIG. 3A.

FIGS. 3A and 3B depict still another example of an antenna assembly 300 according to some embodiments. Antenna assembly 300 again comprises three layers-namely, an antenna body 350 and a cover plate 310 defining a parallel plate waveguide therebetween and a sidewall piece 340 positioned therebetween to define sidewalls for the parallel plate waveguide. As mentioned above, it is contemplated that this embodiment may be useful in connection with multi-beam antennas. Alternatively, this embodiment can be considered a partial reproduction of a complete antenna that may be more readily usable in the automotive industry for RADAR sensing. In particular, it is contemplated that a complete antenna may include the arrays of vertical protrusions and radiating slots arrays of these figures along with those of the embodiment of FIGS. 2A and 2B.

The sidewall piece 340 again comprises a plurality of sidewall protrusions 342. However, unlike sidewall piece 240 of assembly 200, sidewall protrusions 342 extend in between each pair of adjacent columns 352*a*/352*b*, etc., of vertical protrusions 352 and, because radiating slots 302 are aligned with protrusions 352, each pair of adjacent columns 302*a*/302*b*, etc., of radiating slots 302.

Similar to the previously depicted embodiments, antenna body 350 comprises an elongated slot or tunnel extending adjacent to one side thereof to define a self-contained waveguide 355 therein. In addition, a series of feed slots 358 arranged in a row are positioned along waveguide 355 to facilitate introduction of electromagnetic energy into the parallel plate waveguide collectively defined by layers 310, 340, and 350.

Figure 4A:
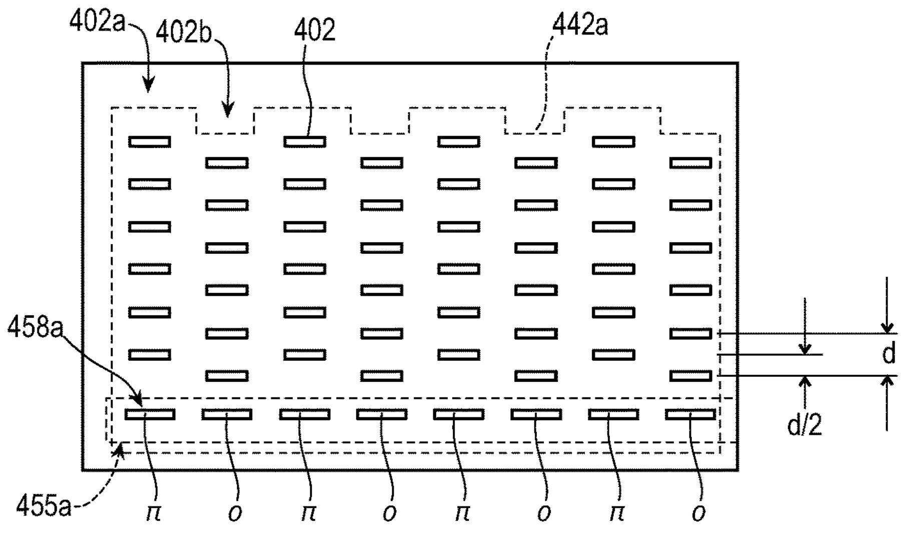
FIGS. 4A-4C are schematic diagrams illustrating the principle of operation of various embodiments disclosed herein.
Figure 4B:
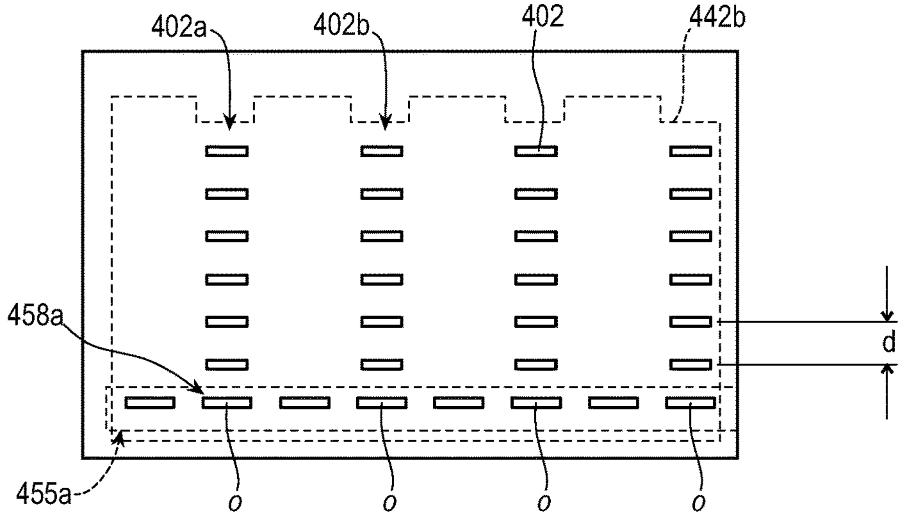
Figure 4C:
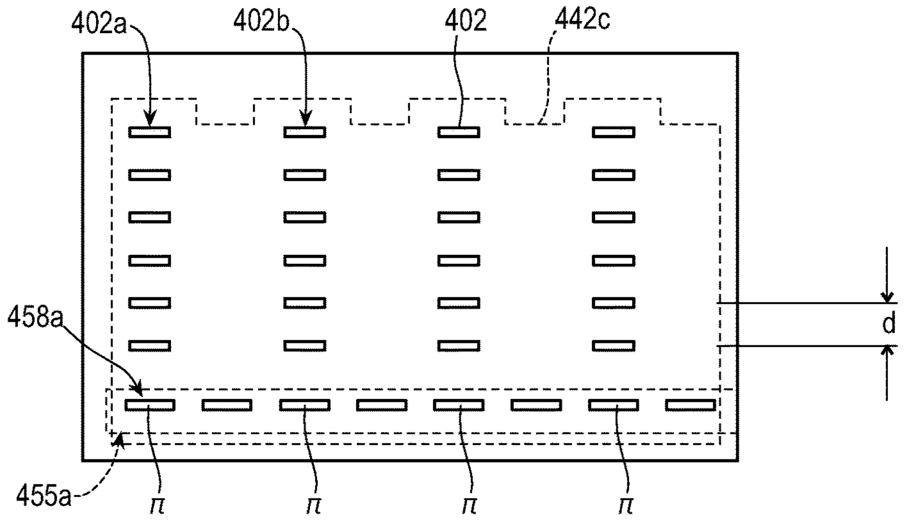

FIGS. 4A-4C illustrate one of the principles of operation of some of the embodiments disclosed herein. Each of these figures depicts the relative placement of radiating slots 402 and feed slots 458*a* of an adjacent self-contained waveguide 455*a*. The arrangement depicted in FIG. 4A can be generated by interleaving the structures shown in FIGS. 4B and 4C. Although various other structures described herein, such as vertical protrusions, are not shown in these figures for ensuring clarity of disclosing the principles of operation, it should be understood that such structures may be added, or omitted, as desired. In addition, although the inventors are disclosing the contemplated principles of operation of the depicted structures, this disclosure should not be considered limited by theory.

FIG. 4A depicts a series of spaced feeding slots 458*a* excited with alternating phases, namely, 0, π, 0, π, . . . 0, π, such that that any pair of adjacent feeding slots 458*a* is excited out of phase. Such an excitation takes place when the incident and the reflected waves from the shorted end of the internal waveguide 455*a* form a standing wave. However, if the feeding waveguide is long enough, you may not have a standing wave, but may still excite the slots in the same way. The feed slots 458*a* are preferably separated from one another by a distance of about $\lambda_{wg}/2$, where $\lambda_{wg}$ is a wavelength in the waveguide 455*a*. The wavelength in waveguide 455*a* may be determined by the dimensions of the waveguide and can be calculated using formulas for waveguides available to those of ordinary skill in the art.

FIG. 4A also depicts an array of radiating slots 402 formed into offset rows 402*a*/402*b*, etc. Sidewall/horizontal protrusions 442*a* (442*b* and 442*c* in FIGS. 4B and 4C, respectively) can also be seen extending in between adjacent columns of radiating slots 402 such that the distance from an out radiating slot 402 to the edge of the sidewall is consistent from column to column.

A distance between adjacent radiating slots 402 in the same column is shown in FIGS. 4A-4C as d. Given that adjacent columns of radiating slots 402 are staggered in FIG. 4A, the distance to the midpoint between adjacent radiating slots 402 in the same column, or the distance along the "x axis" (vertical in FIG. 4A) between a radiating slot 402 in one row and a radiating slot in an adjacent, staggered column, is shown as d/2.

Considering a single column of equidistant radiating slots 402 separated by distance d, the slot-to-slot phase difference will be $(2\pi \cdot d)/(\lambda_{P-P})$, where $\lambda_{P-P}$ is the wavelength in the parallel-plate waveguide. Given the $TM_0$-mode of propagation and small losses, $\lambda_{P-P}$ can be close to $\lambda_0$—the wavelength in free space.

The progressively changing phase of excitation of slots in the x direction, depending on d, will determine the angle of the main lobe of the radiation pattern of the corresponding antenna—i.e., the "squint angle."

With a sufficiently large d (e.g., $d>0.5\lambda_0$), the radiation pattern of the column of radiating slots 402 will have a big grating lobe, comparable with the main lobe. The grating lobe can, however, be suppressed if two adjacent columns of radiating slots 402 are used instead of a single column; and if one column is shifted relative to the other at distance d/2 in the x direction to provide offset columns of radiating slots, as previously described.

On the one hand, considering a special case when d is close to $\lambda_0$, shifting one column of radiating slots 402 by d/2, will add $\pi$ radians phase difference to the out-of-phase excited column, thereby equalizing the phases in adjacent columns. On the other hand, the slot-to-slot distance in the x direction in the composite array formed by the two adjacent rows is reduced and is only d/2. Again, without being limited by theory, it is thought that this explains why the array of two columns of offset radiating slots 402 will efficiently radiate and have reduced grating lobes compared with a single column of such radiating slots 402.

The following example considers a more general case when d is not necessarily close to $\lambda_0$. The radiation pattern of two adjacent columns is $$|F2(\theta)|=|F1(\theta)|\cdot|AF(\theta)|, \text{ where:}$$

- $|F|(\theta)|$ is absolute value of the radiation pattern of a single column;
- $|F2(\theta)|$ is absolute value of the radiation pattern of the two adjacent columns;
- $|AF(\theta)|$ is absolute value of the array factor of the two adjacent columns; and $$|AF(\theta)|=|\exp(-j\pi d/\lambda_0 \sin(\theta))+\exp(-j\pi d/\lambda_0-j\pi)|$$

Calculations show that $|F2(\theta)|$ will have sufficiently reduced grating lobe because it will be suppressed by the array factor $|AF(\theta)|$.

The structure in FIG. 4A therefore represents a squinted beam antenna with a beam pointing at the direction determined by the value of d and having a suppressed grating lobe. The antenna in FIG. 4A comprises adjacent columns of slots 402 (columns 402*a*, 402*b*, etc.) one of which is shifted by d/2 relative to the other and repeated in the y direction with the step of repetition $\lambda_{Wg}/2$. Alternatively, the antenna in FIG. 4A is an antenna obtained by interleaving the slot arrays in FIGS. 4B and 4C such that they are shifted by d/2 in the x direction. Each of antennas in FIGS. 4B and 4C therefore will have a big grating lobe, whereas the interleaved antenna of FIG. 4A will have a comparatively reduced grating lobe. In this case, $|F1(\theta)|$ in the above equation will have meaning of absolute value of the radiation pattern of structures depicted in FIGS. 4B and 4C, which considered substantially identical. More complete details of these embodiments are represented in FIGS. 2A-3B.

Figure 5:
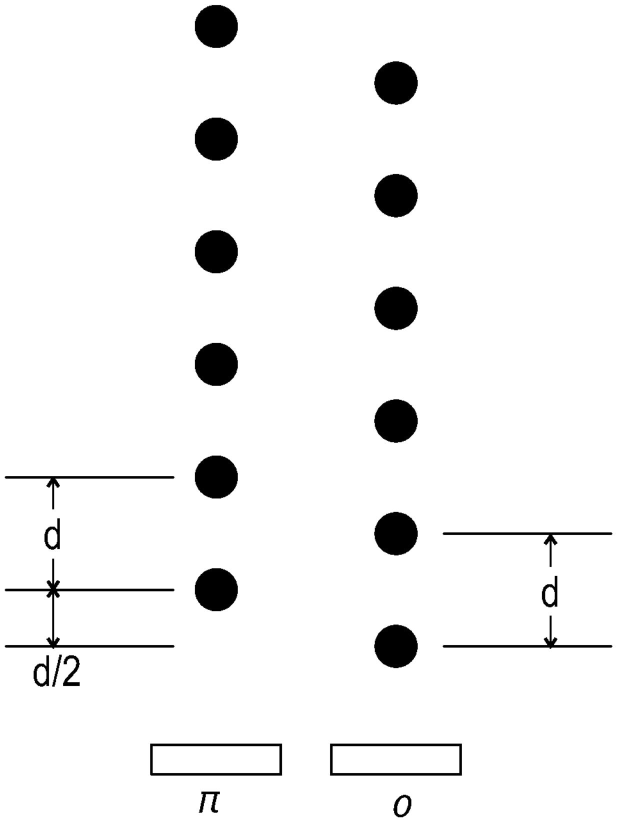
FIG. 5 depicts a simplified model illustrating how suppression of unwanted grating lobes may be achieved by various embodiments.

FIG. 5 is a schematic diagram illustrating a simplified model wherein the columns of radiating slots are replaced by ideal isotropic radiators. The two columns of radiators are energized by the out-off phase waves sources, so that the radiator-to-radiator phase difference is $2\pi \cdot d/\lambda_0$ and amplitudes are assumed equal. The adjacent columns of radiators are again shifted by d/2 relative to each other. The results of radiation pattern calculations from this diagram, made under the assumptions provided above, are illustrated in FIGS. 16A-16D and will be discussed in greater detail below.

Figure 6A:
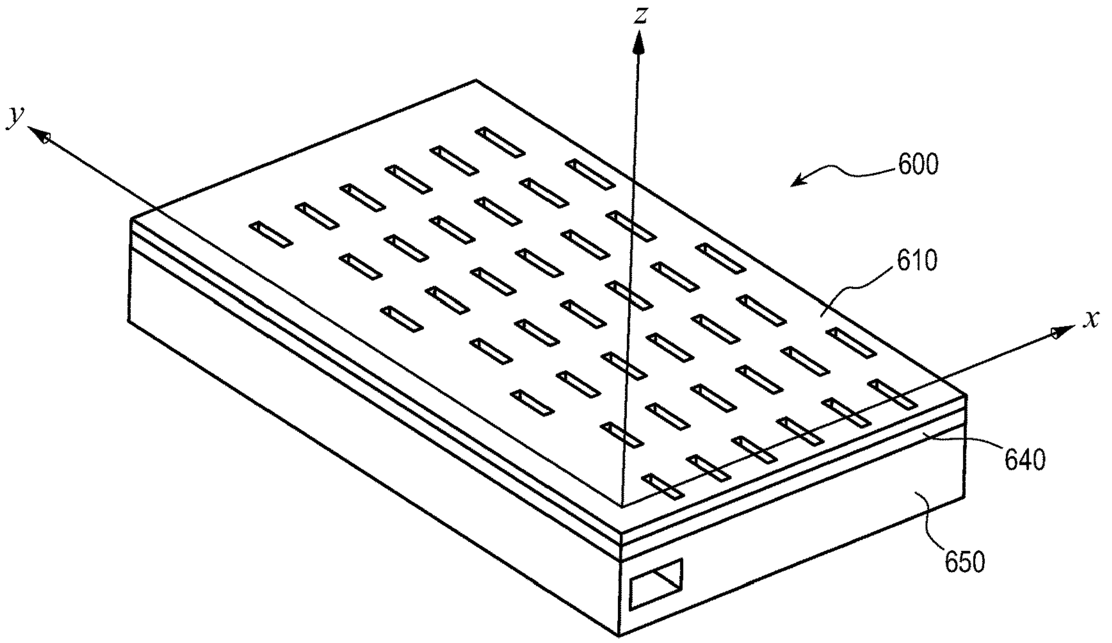
FIG. 6A is a perspective view of another antenna assembly featuring a single, elongated feed slot.
Figure 6B:
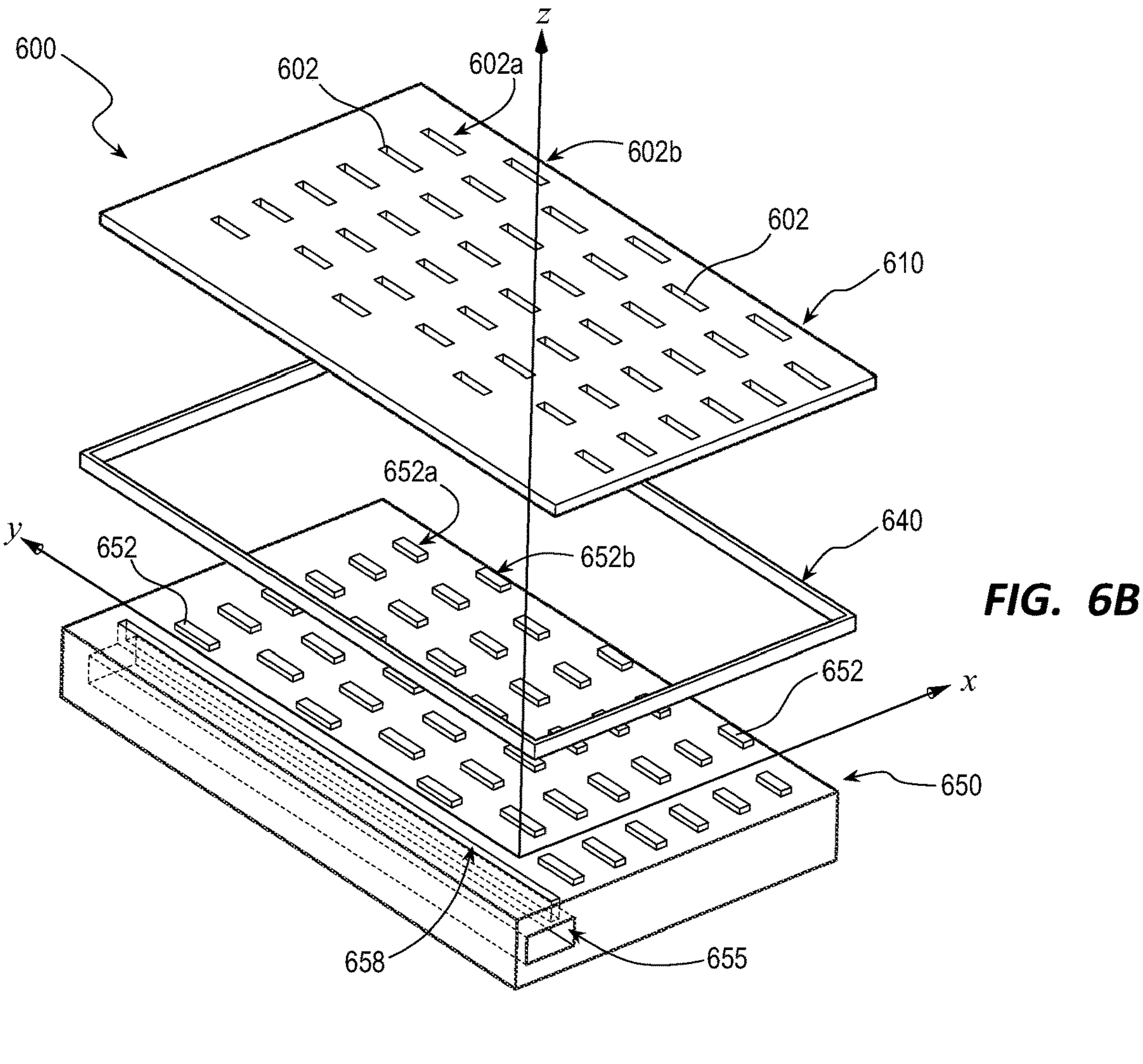
FIG. 6B is an exploded, perspective view of the antenna assembly of FIG. 6A.

FIGS. 6A and 6B illustrate still another embodiment of an antenna assembly 600. Antenna assembly 600 again comprises three layers-namely, an antenna body 650, a cover plate 610 defining a parallel plate waveguide therebetween, and a sidewall piece 640 positioned therebetween to define sidewalls for the parallel plate waveguide.

As shown in FIG. 6B, the sidewall piece 640 lacks the sidewall protrusions shown in the previously depicted embodiments. Thus, sidewall piece 640 is solely present in order to define sidewalls for the parallel plate waveguide defined between cover plate 610 and antenna body 650. As previously mentioned, however, sidewalls may be defined by either or both of the other pieces of the assembly rather than by a separate layer as shown, if desired.

As also shown in FIG. 6B, cover plate 610 comprises an array of radiating slots 602 arranged in columns that are staggered or shifted relative to one another. Thus, column 602*b* comprises slots 602 shifted so as to be at a position along the x axis in between adjacent slots 602 in column 602*a*, and so on.

Similar to the previously depicted embodiments, antenna body 650 comprises an elongated slot or tunnel extending adjacent to one side thereof to define a self-contained waveguide 655 therein. However, rather than providing a series of feed slots along waveguide 655, a single, elongated slot 658 is provided along waveguide 655 to facilitate introduction of electromagnetic energy into the parallel plate waveguide collectively defined by layers 610, 640, and 650.

Antenna body 650 further comprises a plurality of vertical protrusions 652 extending into the aforementioned parallel plate waveguide. Protrusions 652 are, like radiating slots 602, arranged in a staggered array in which each column of protrusions 652 is shifted relative to each adjacent column of protrusions 652, preferably such that the protrusions 652 in one column (652*b*, for example) are shifted along the x axis relative to each adjacent column (652*a*, for example) so as to be at or near a midpoint between adjacent protrusions 652 in an adjacent column.

Figure 7A:
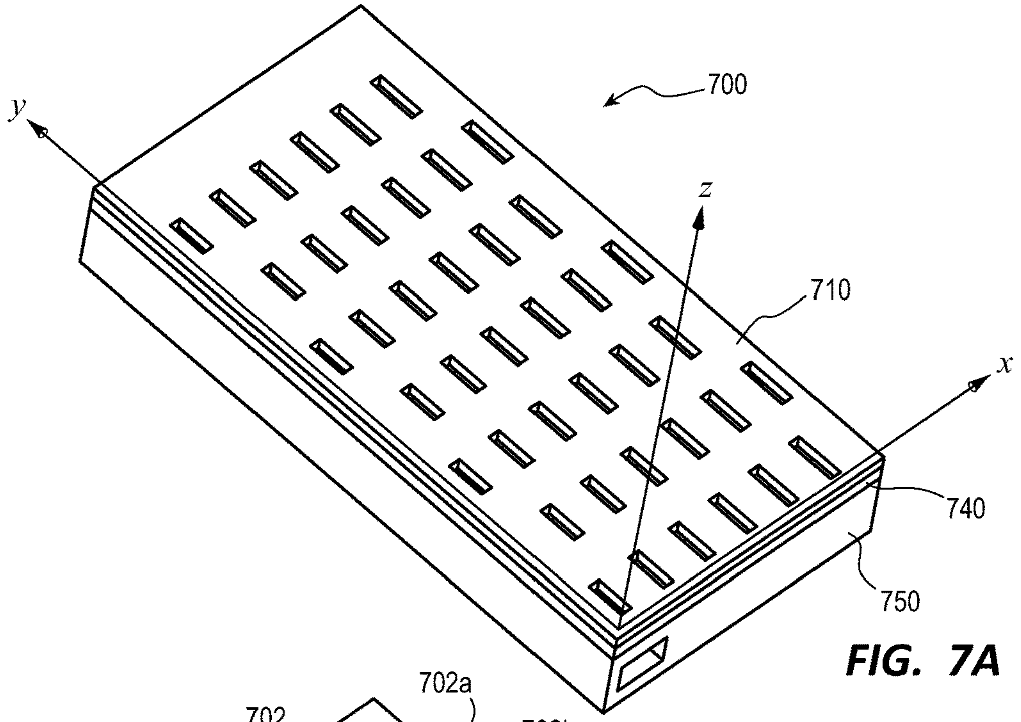
FIG. 7A is a perspective view of an antenna assembly according to additional embodiments with protrusions positioned on opposite sides of a feed slot.
Figure 7B:
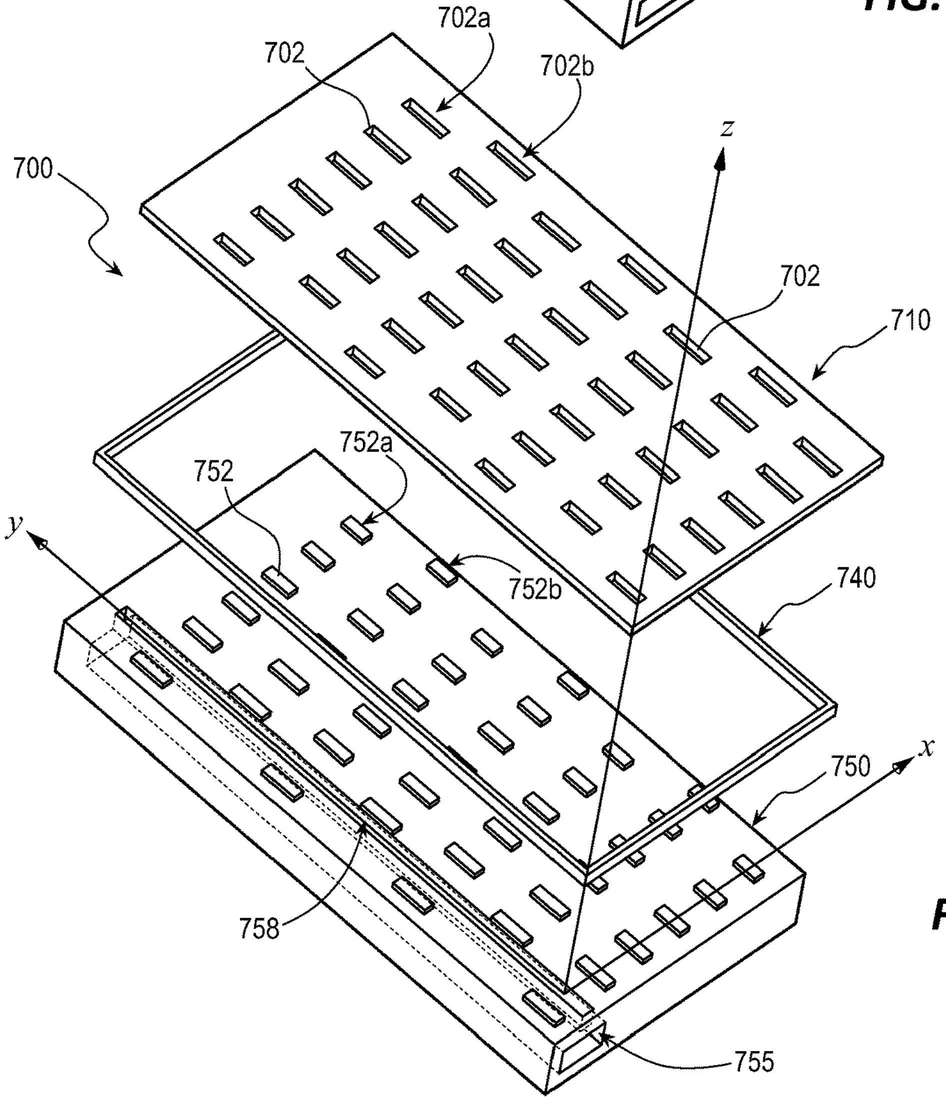
FIG. 7B is an exploded, perspective view of the antenna assembly of FIG. 7A.

Yet another embodiment of an antenna assembly 700 is depicted in FIGS. 7A and 7B. As shown in FIG. 7B, antenna assembly 700 again comprises three layers-namely, an antenna body 750, a cover plate 710 defining a parallel plate waveguide therebetween, and a sidewall piece 740 positioned therebetween to define sidewalls for the parallel plate waveguide.

Like assembly 600, the sidewall piece 740 of assembly 700 lacks sidewall protrusions. As shown in FIG. 7B, cover plate 710 again comprises an array of radiating slots 702 arranged in columns 702*a*, 702*b*, etc., that are staggered or shifted relative to one another.

Similar to the previously depicted embodiments, antenna body 750 comprises an elongated slot or tunnel extending adjacent to one side thereof to define a self-contained waveguide 755 therein. Similar to assembly 600, waveguide 755 of assembly 700 comprises a single, elongated slot 758 configured to facilitate introduction of electromagnetic energy into the parallel plate waveguide collectively defined by layers 710, 740, and 750.

Antenna body 750 further comprises a plurality of vertical protrusions 752 extending into the aforementioned parallel plate waveguide. Protrusions 752 are, like radiating slots 702, arranged in a staggered array in which each column of protrusions 752 is shifted relative to each adjacent column of protrusions 752, preferably such that the protrusions 752 in one column (752*b*, for example) are shifted along the x axis relative to each adjacent column (752*a*, for example) so as to be at or near a midpoint between adjacent protrusions 752 along the x axis in an adjacent column.

However, antenna body 750 differs from the embodiments depicted in previous embodiments in that some of the protrusions 752, along with their corresponding radiating slots 702, are positioned on opposite sides of feed slot 758. In the depicted embodiment, one protrusion 752 from every other column is positioned on one side of feed slot 758 and the remainder of protrusions 752 are all positioned above, or on the other side of feed slot 758. However, as those of ordinary skill in the art will appreciate, a variety of alternatives are possible. For example, although it may be preferred for certain applications that most of the slots and protrusions are positioned on just one side of the feed slot(s) and/or self-contained waveguide, it may be useful for certain purposes to position additional protrusions 752 and/or radiating slots 702 "below" (from the perspective of the figures) waveguide 755 and/or feed slot 758. To accomplish this, the waveguide 755 may, in some embodiments, be shifted up along the x axis to a more central position within antenna body 750. This embodiment further illustrates the fact that the number of the columns and/or rows of radiating slots and/or vertical protrusions may be odd instead of even.

Figure 8A:
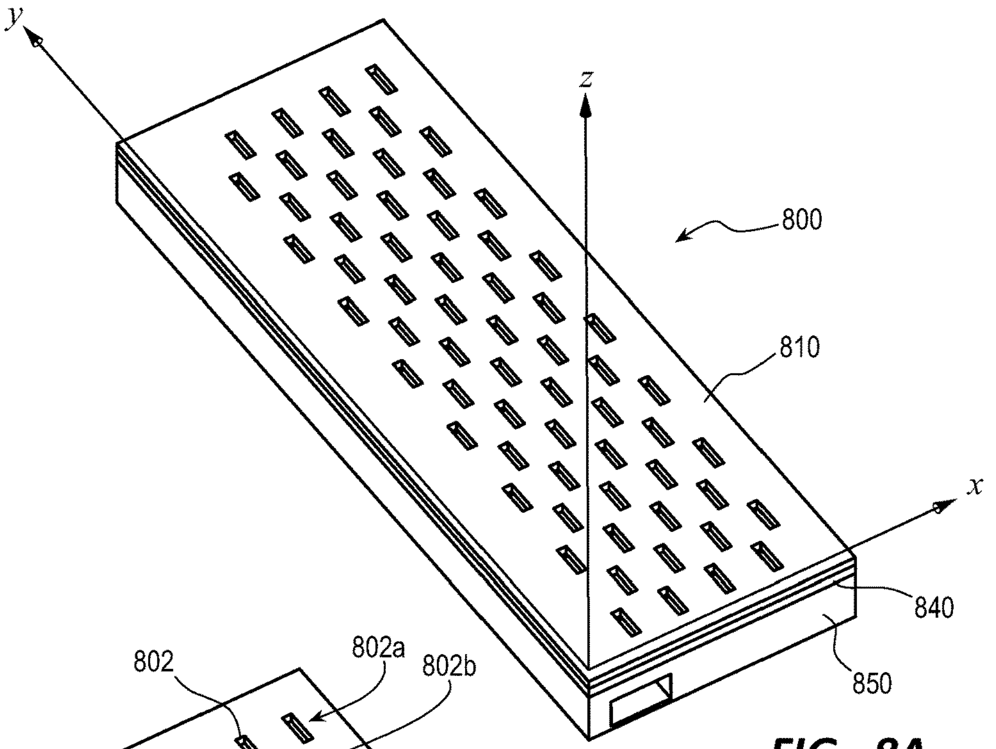
FIG. 8A is a perspective view of an antenna assembly according to yet other embodiments, more particularly, a possible embodiment of a high-gain antenna with a defined beam squint.
Figure 8B:
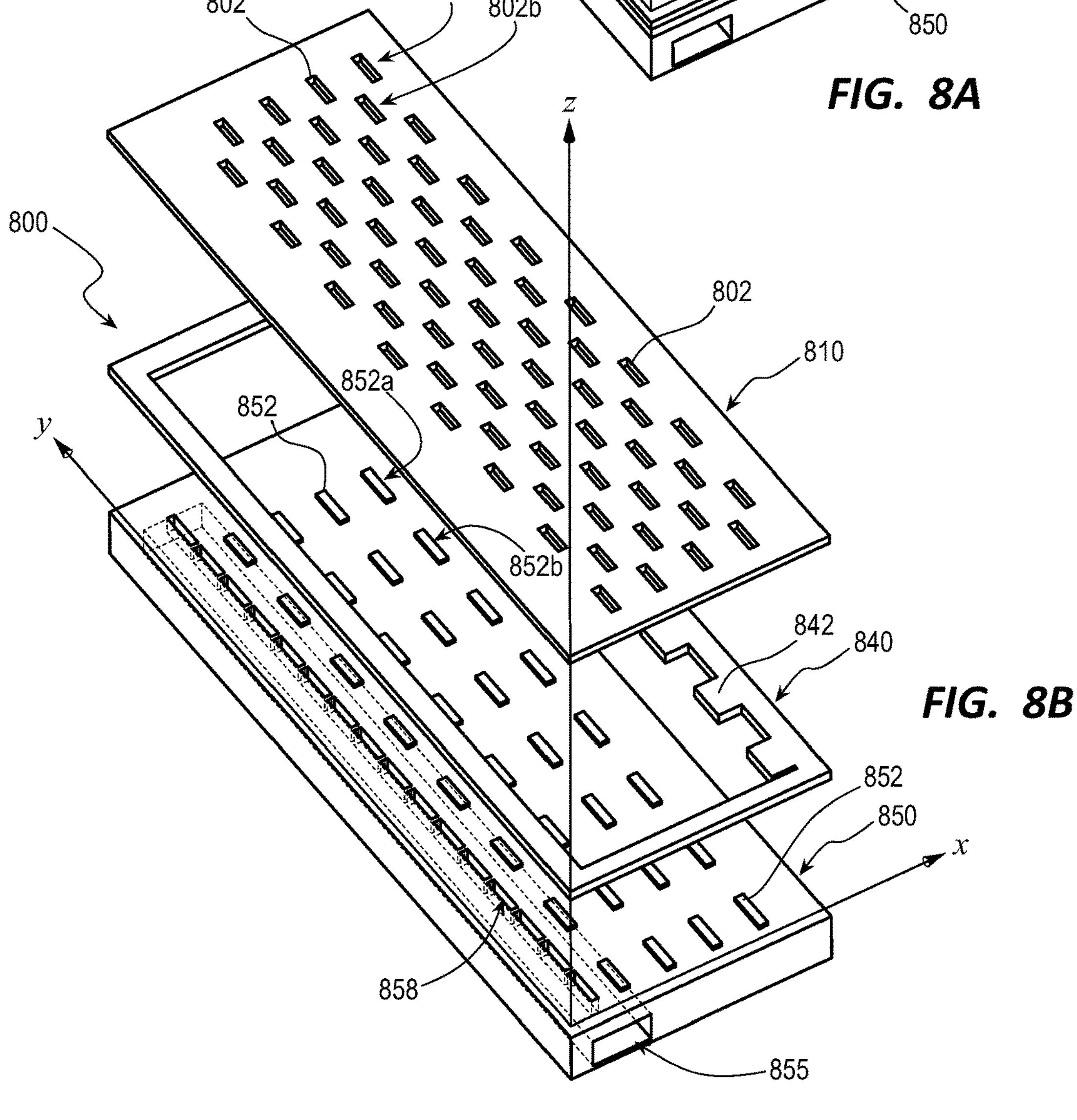
FIG. 8B is an exploded, perspective view of the antenna assembly of FIG. 8A.

Another antenna assembly 800 according to other embodiments is depicted in FIGS. 8A and 8B. As shown in FIG. 8B, antenna assembly 800 again comprises an antenna body 850, a cover plate 810 defining a parallel plate waveguide therebetween, and a sidewall piece 840 positioned therebetween to define sidewalls for the parallel plate waveguide. Sidewall piece 840 comprises a series of horizontal protrusions 842 equal in number to the number of vertical protrusions 852 on antenna body 850.

As also shown in FIG. 8B, cover plate 810 again comprises an array of radiating slots 802 arranged in columns 802*a*, 802*b*, etc., that are staggered or shifted relative to one another. It is worth noting that, in this embodiment, the number of radiating slots 802 is double (but need not be precisely double in alternative embodiments; at least substantially double, such between about 180% and about 220% in some embodiments, for example, of) the number of vertical protrusions 852. More particularly, there is an additional staggered column of radiating slots 802 positioned between each pair of adjacent columns (852*a*, 852*b*, etc.) of vertical protrusions 852, which themselves are not staggered in this embodiment. Of course, if higher antenna gain is desired, the number of radiating slots 802 may be more than double the number of vertical protrusions 852. It is thought that the number of radiating slots 802 may be increased as desired to provide an increase in antenna gain, but that increases along the x axis may be more limited than those along the y axis for certain applications. It should also be understood that, in a variation of the embodiment of FIGS. 8A and 8B, the number of vertical protrusions 852 may be increased in number to match, or nearly match, the number of radiating slots 802 if desired.

In addition, it is further contemplated that the vertical protrusions 852 may be formed in staggered columns in alternative embodiments, as previously described. Also. it should be noted that the number of columns of radiating slots 802 is typically equal to the number of columns of vertical protrusions 852 as in the above embodiments, however some vertical protrusions may be excluded, or even the whole columns of vertical protrusions may be excluded, in alternative embodiments, as shown in FIG. 8B.

Antenna body 850 again comprises an elongated slot or tunnel extending adjacent to one side thereof to define a self-contained waveguide 855 therein. Waveguide 855 comprises a plurality of spaced feed slots 858 extending a row, which slots 858 are configured to facilitate introduction of electromagnetic energy into the parallel plate waveguide collectively defined by layers 810, 840, and 850.

Antenna assembly 800 illustrates a possible embodiment of a high-gain antenna with a defined beam squint. The radiating slots 802 are arranged in 16 columns with 4 slots in each column. Simulated gain of this antenna is 21 dB with a squint angle of 45 degrees.

Figure 9A:
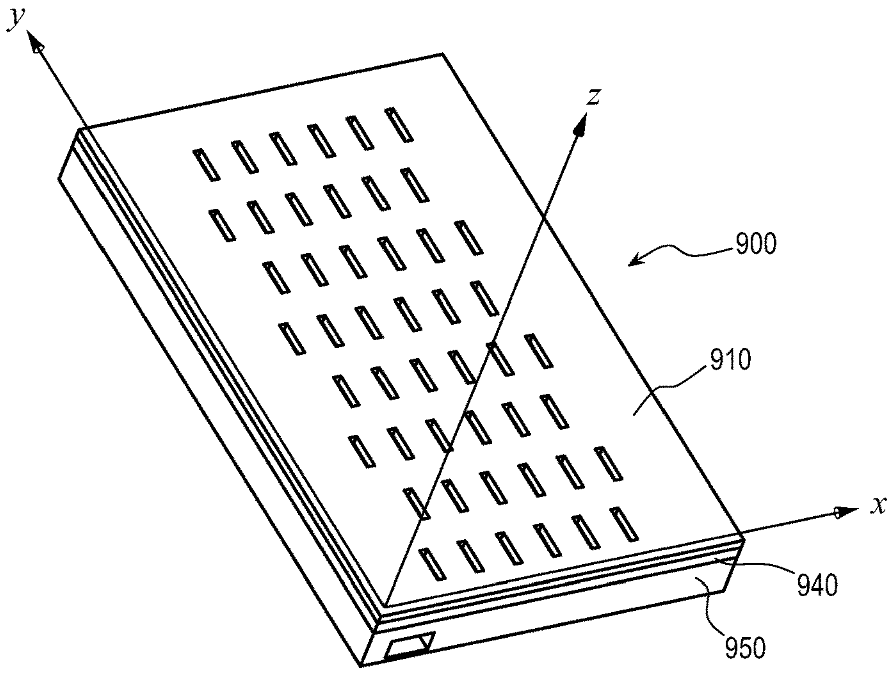
FIG. 9A is a perspective view of yet another embodiment of an antenna assembly.
Figure 9B:
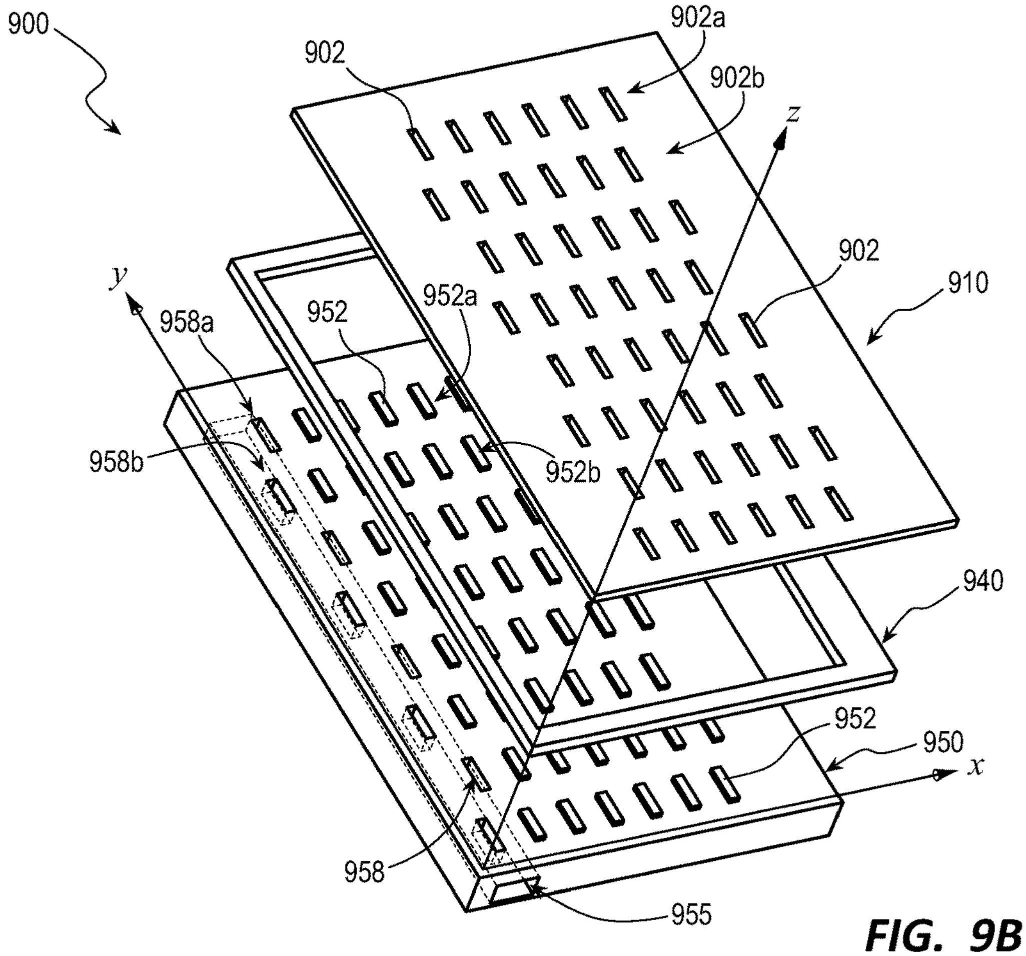
FIG. 9B is an exploded, perspective view of the antenna assembly of FIG. 9A.

Still another antenna assembly 900 according to other embodiments is depicted in FIGS. 9A and 9B. Antenna assembly 900 again comprises an antenna body 950, a cover plate 910 defining a parallel plate waveguide therebetween, and a sidewall piece 940 positioned therebetween to define sidewalls for the parallel plate waveguide. Sidewall piece 940 lacks horizontal protrusions.

As shown in FIG. 9B, cover plate 910 again comprises an array of radiating slots 902 arranged in columns 902*a*, 902*b*, etc., that are staggered or shifted relative to one another. Unlike cover plate 810, the number of radiating slots 902 is equal (but may be substantially equal in other embodiments—such as within ±10%) to the number of vertical protrusions 952 on antenna body 950, which are themselves arranged in staggered columns 952*a*, 952*b*, etc., as previously described. However, in this embodiments, the radiating slots 902 need not be staggered and, as previously mentioned, the protrusions 952 may be omitted. Thus, protrusions 952*a* and 952*b*, as well as slots 902*a* and 902*b* may or may not be staggered in this embodiment. If staggered, they may be staggered less than d/2 distance; they may be staggered by nearly the same distance as the distance from feed slots 958*a* to feed slots 958*b* along the X direction.

Antenna body 950 comprises an elongated slot or tunnel extending adjacent to one side thereof to define a self-contained waveguide 955 therein. Waveguide 955, however, differs from all previously depicted embodiments in that it comprises a plurality of spaced feed slots 958 extending in two adjacent, staggered rows. More particularly, a first row 958*a* of feed slots 958 extends along waveguide 955 and includes feed slots 958 that are aligned with every other column of vertical protrusions 952. Similarly, a second row 958*b* of feed slots 958 extends along waveguide 955 spaced apart from row 958*a* along the x axis and includes feed slots 958 that are aligned with every other column of vertical protrusions 952 (the columns of vertical protrusions 952 lacking a corresponding, adjacent feed slot 958 in column 958*a*). It is also worth noting that row 958*a* of feed slots 958 are positioned adjacent to a first sidewall of waveguide 955 and row 958*b* of feed slots 958 are positioned adjacent to a second sidewall of waveguide 955 opposite from the aforementioned first sidewall. It should be noted that columns 958*a* and 958*b* are located on the opposite sides of the waveguide 955 central line.

Because feed slots 958 are arranged on opposite sides of waveguide 955 relative to the waveguide central line, they are excited in phase, given that the slot-to-slot distance along the Y axis is preferably $\lambda_{Wg}/2$. Additional phase difference that may be caused by the distance between the feed slots 958*a* and 958*b* along the X axis may be compensated by staggering vertical protrusions 952*a* and 952*b* and radiating slots 902*a* and 902*b* by the same distance. This arrangement allows additional flexibility in controlling the phases of the radiating slots 902.

Figure 10A:
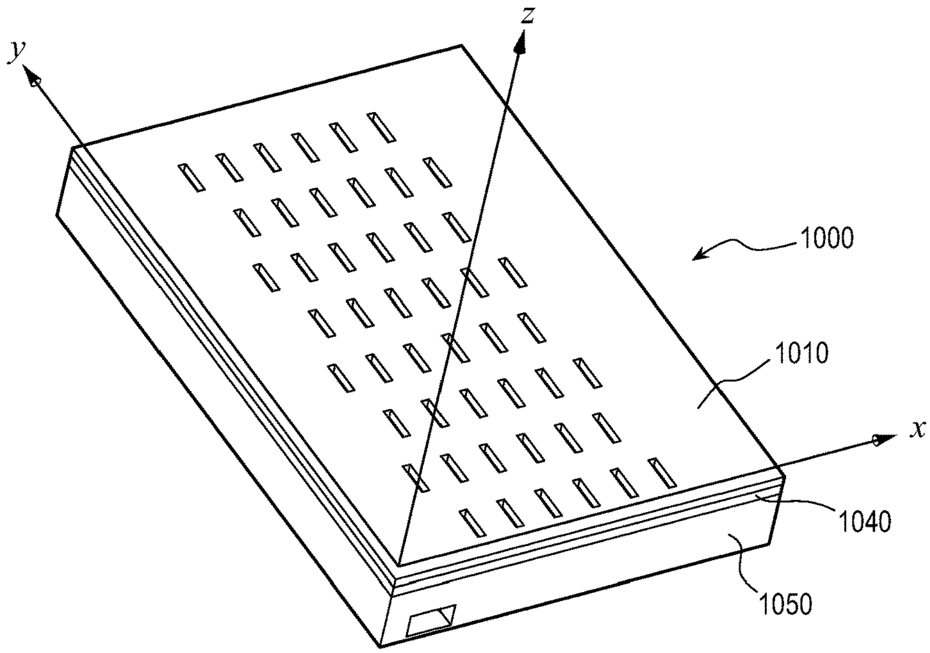
FIG. 10A is a perspective view of still another embodiment of an antenna assembly in which the straight waveguide shown in previous embodiments is replaced with a "wavy" waveguide.
Figure 10B:
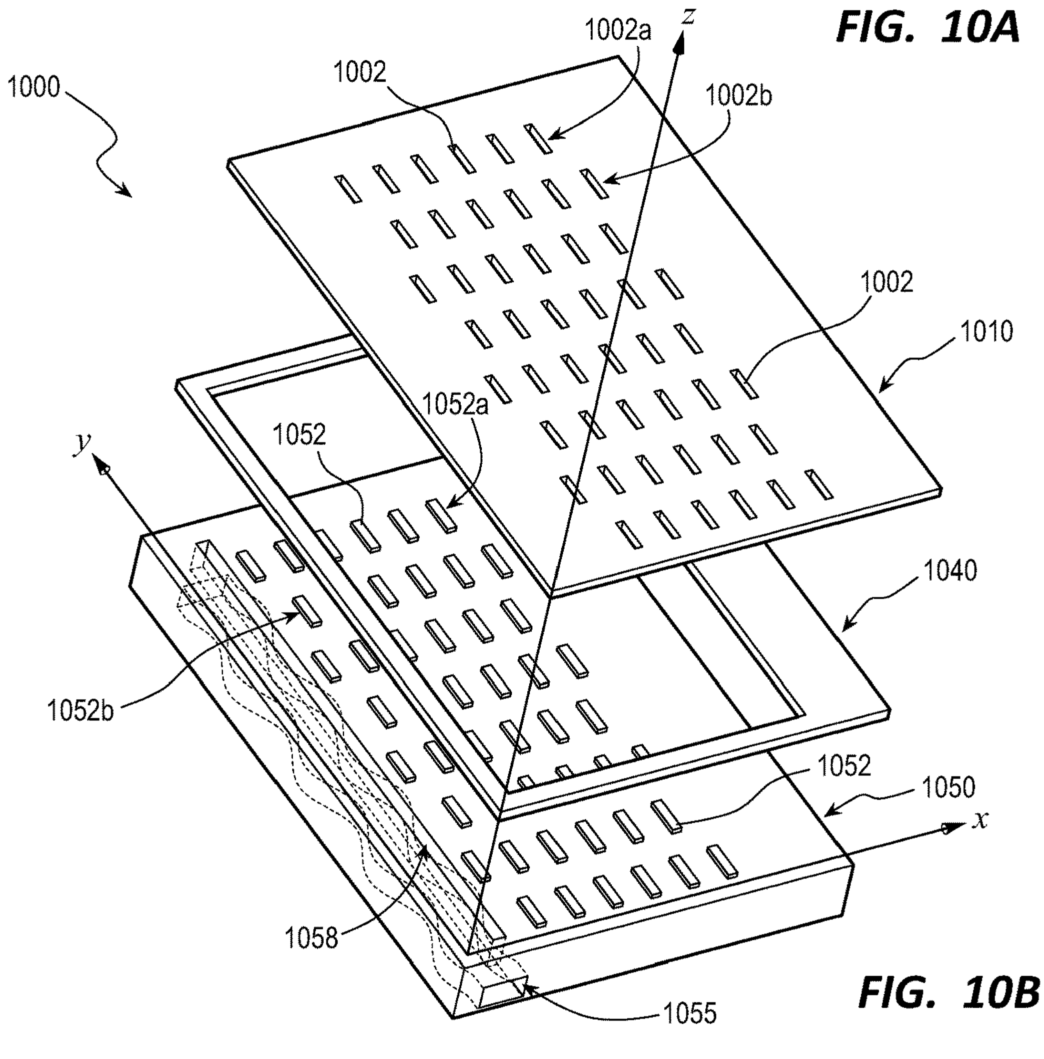
FIG. 10B is an exploded, perspective view of the antenna assembly of FIG. 10A.

Yet another antenna assembly 1000 according to other embodiments is depicted in FIGS. 10A and 10B. Antenna assembly 1000 again comprises an antenna body 1050, a cover plate 1010 defining a parallel plate waveguide therebetween, and a sidewall piece 1040 positioned therebetween to define sidewalls for the parallel plate waveguide. Sidewall piece 1040 also lacks horizontal protrusions.

As shown in FIG. 10B, cover plate 1010 again comprises an array of radiating slots 1002 arranged in columns 1002*a*, 1002*b*, etc. Each column of the radiating slots 1002*a* and 1002*b* will be excited in phase. Therefore, staggering of radiating slots 1002*a* and 1002*b* is not necessarily required in this embodiment even though FIG. 10B shows staggered radiating slots 1002. However, if desired, additional phasing of the adjacent columns of radiating slots 1002*a* and 1002*b* can be achieved by staggering (shifting) the columns relative to each other.

Antenna body 1050 again comprises an elongated slot or tunnel extending adjacent to one side thereof to define a self-contained waveguide 1055 therein. Waveguide 1055, however, differs from all previously depicted embodiments in that it is "wavy." In other words, waveguide 1055 is defined by sidewalls that curve or meander back and forth together, at least in part, in a manner similar to a sine wave. Of course, other embodiments are contemplated in which the meandering may be defined by sharp corners and straight lines rather than a curved line. A single feed slot 1058 extends along waveguide 1055, preferably at a central or at least relatively central location such that the feed slot 1058 is crossing a "wavy" central line of the waveguide 1055. The imaginary central line of the "wavy" waveguide 1055 is also "wavy" and is located in the middle, between the "wavy" internal walls of waveguide 1055.

In some embodiments, the peaks and valleys of the waveguide 1055 may be aligned, or at least substantially correspond with, the positioning of the adjacent radiating slots 1002 and/or protrusions. Of course, this alignment of peaks/valleys of waveguide 1055 and the radiating slots 1002 and/or protrusions need not be part of all contemplated embodiments.

It is also worth noting that a "wavy" waveguide can be a periodically curved or otherwise bent waveguide with a period of $\lambda_{Wg}$. For example, it can be a waveguide with the "wavy" central line described by the equation $X=A\cdot\sin(2\pi Y/\lambda_{Wg}+\phi)$. The portions of the feed slot (or individual feed slots) preferably separated by a distance $\lambda_{Wg}/2$ will be excited in-phase because they interrupt the currents on the opposite sides of the waveguide 1055 "wavy" central line. This can be verified by considering a surface currents distribution in a rectangular waveguide. Therefore, each column of the radiating slots will be excited in phase. Additional phasing of the adjacent columns of radiating slots can be achieved by shifting the columns relative to each other as previously described.

Figure 11A:
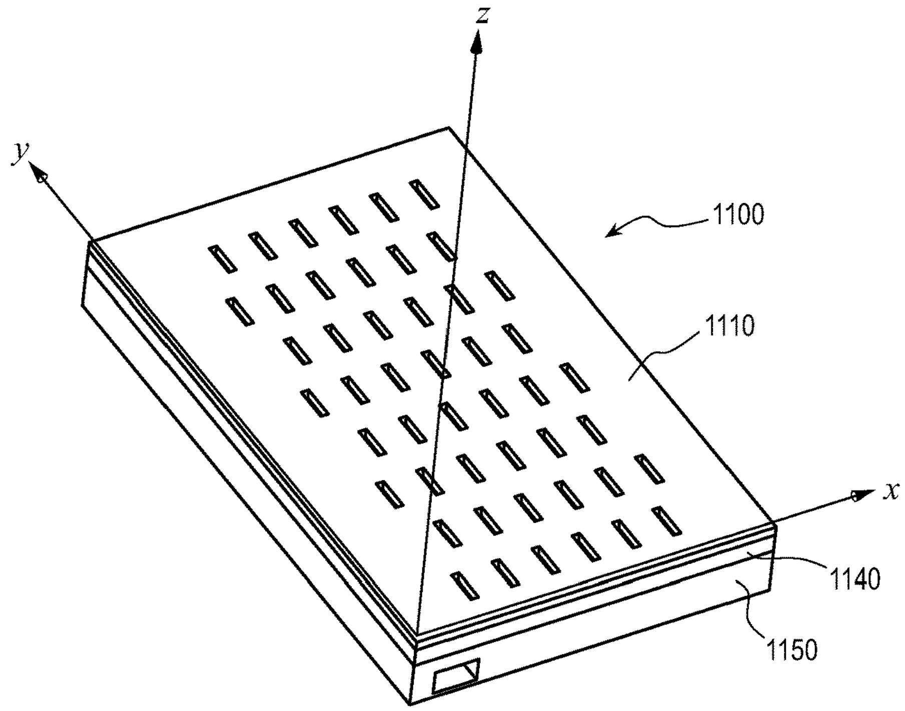
FIG. 11A is a perspective view of an antenna assembly having wavy feed slots according to further embodiments.
Figure 11B:
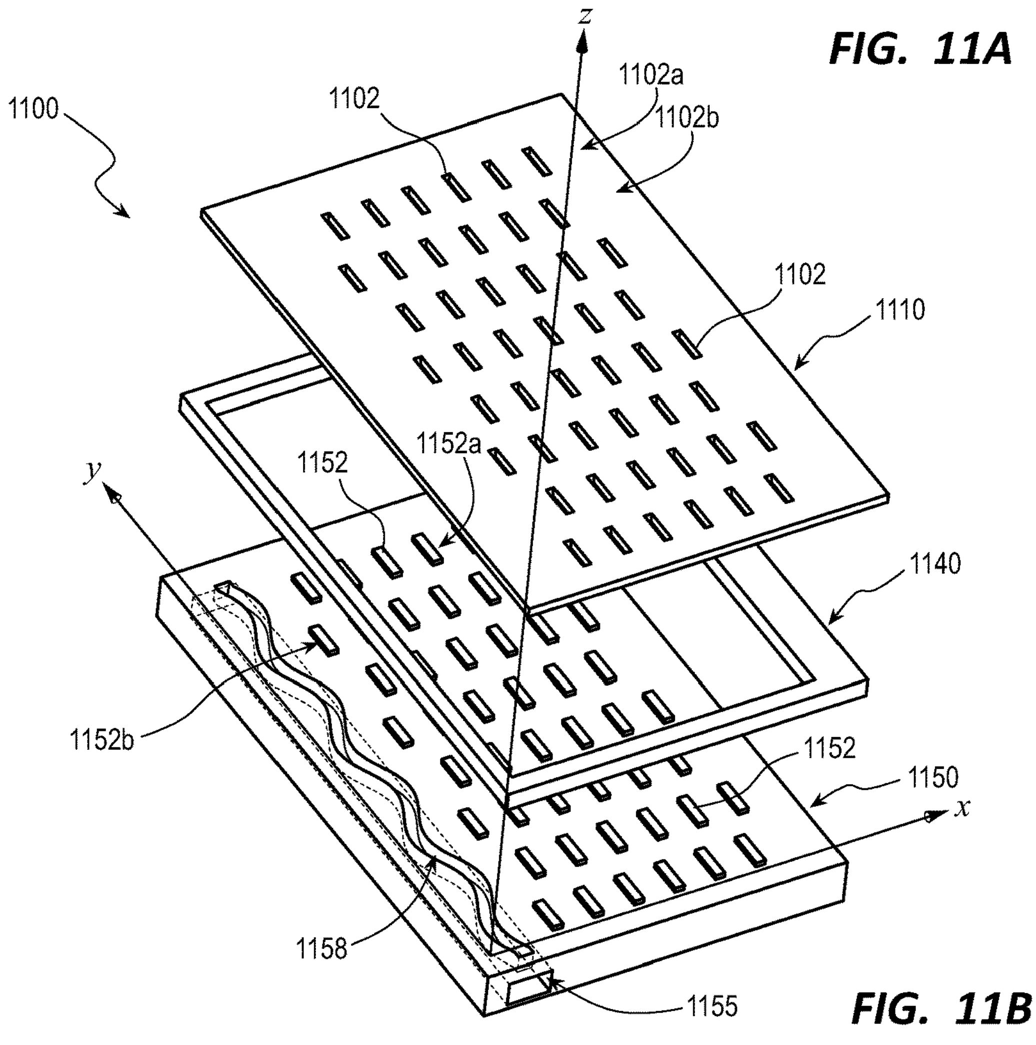
FIG. 11B is an exploded, perspective view of the antenna assembly of FIG. 11A.

Further alternative structures of various preferred embodiments are provided in antenna assembly 1100 of FIGS. 11A and 11B. Antenna assembly 1100 again comprises an antenna body 1150, a cover plate 1110 defining a parallel plate waveguide therebetween, and a sidewall piece 1140 positioned therebetween to define sidewalls for the parallel plate waveguide. Sidewall piece 1140 lacks horizontal protrusions.

As shown in FIG. 11B, cover plate 1110 again comprises an array of radiating slots 1102 arranged in columns 1102*a*, 1102*b*, etc., that may be staggered or shifted relative to one another if additional phase shifting is desired, as pointed out in previous embodiments. The number of radiating slots 1102 is equal (but may be substantially equal in other embodiments) to the number of vertical protrusions 1152 on antenna body 1150, which are themselves also staggered in columns 1152*a*, 1152*b*, etc., as previously described.

Antenna body 1150 again comprises an elongated slot or tunnel extending adjacent to one side thereof to define a self-contained feed waveguide 1155 therein. Waveguide 1155 may be similar in shape and positioning to various other embodiments disclosed herein. However, feed slot 1158 differs from all previously depicted embodiments in that it is "wavy." In other words, feed slot 1158 curves or otherwise meanders back and forth, at least in part, in a manner similar to a sine wave. Of course, other embodiments are contemplated in which the meandering may be defined by sharp corners and straight lines rather than a curved line.

In the depicted embodiment, the meandering corresponds, at least in part, with the placement of the adjacent protrusions 1152 and radiating slots 1102. Each peak and valley of the feed slot 1158 may be positioned adjacent to a corresponding column of protrusions 1152 and radiating slots 1102 (however, in alternative embodiments, they may be shifted along the y axis from this position) and the number of peaks plus valleys of the feed slot 1158 is equal to the number of columns of protrusions 1152 (or the number of columns of radiating slots 1102). Of course, this need not be precisely the case in all contemplated embodiments but may be preferred.

It is worth mentioning that peaks and valleys of the "wavy" feed slot are located on the opposite side of the central line of waveguide 1155, which itself is straight in this embodiment. Since the distance between the adjacent peaks and valleys along the Y-axis is substantially $\lambda$=Wg/2, they will be excited in phase. Despite the fact that the peaks and valleys are excited in phase, staggering of the radiating slots 1102*a* and 1102*b* and corresponding vertical protrusions 1152*a* and 1152*b* may be desirable. Staggering allows for compensating for the phase difference due to the different traveling distance along the X-axis from the peaks and from the valleys to the appropriate radiating slots 1101*a* and 1102*b*. Operation of the antenna in this embodiment is similar to that depicted in FIGS. 9A-9B.

Figure 12A:
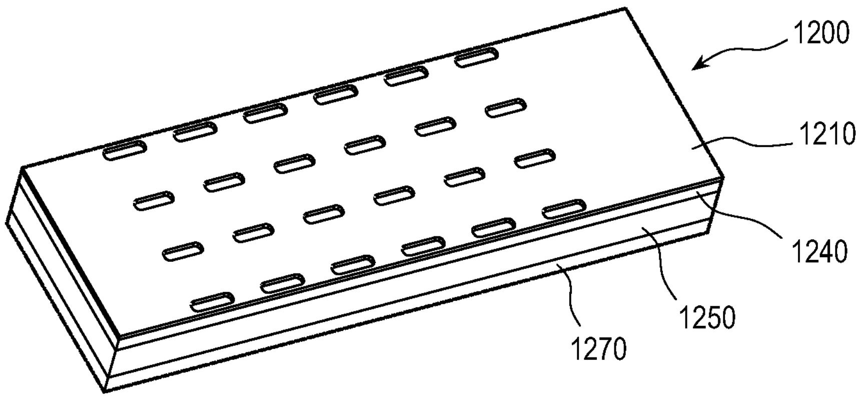
FIG. 12A is an upper perspective view of another antenna assembly.
Figure 12B:
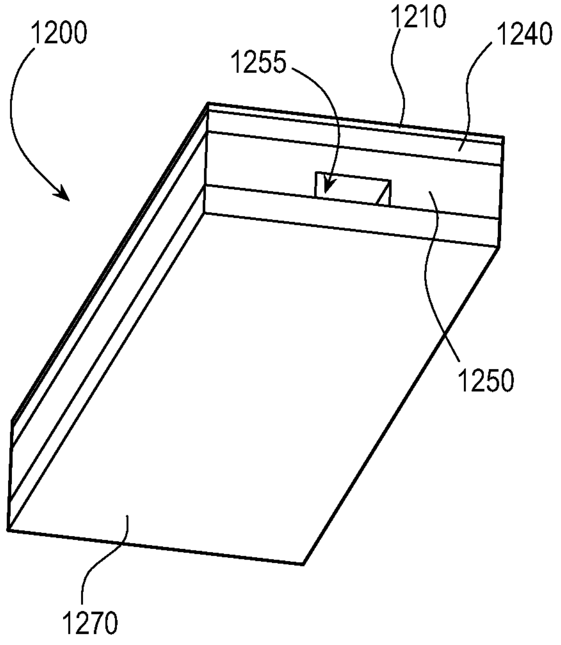
FIG. 12B is a lower perspective view of the antenna assembly of FIG. 12A.
Figure 12C:
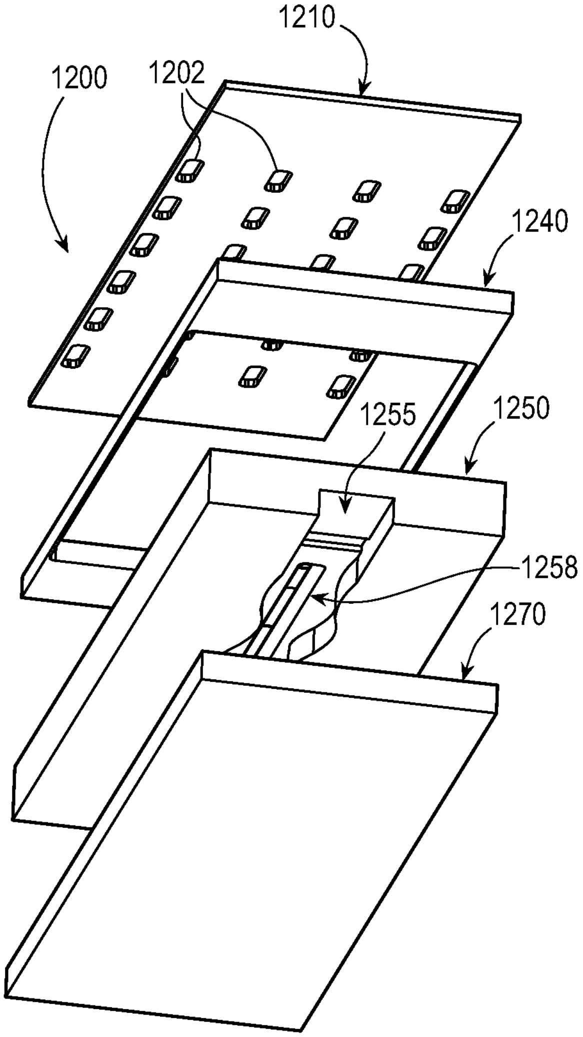
FIG. 12C is an exploded, perspective view of the antenna assembly of FIGS. 12A and 12B.
Figure 13A:
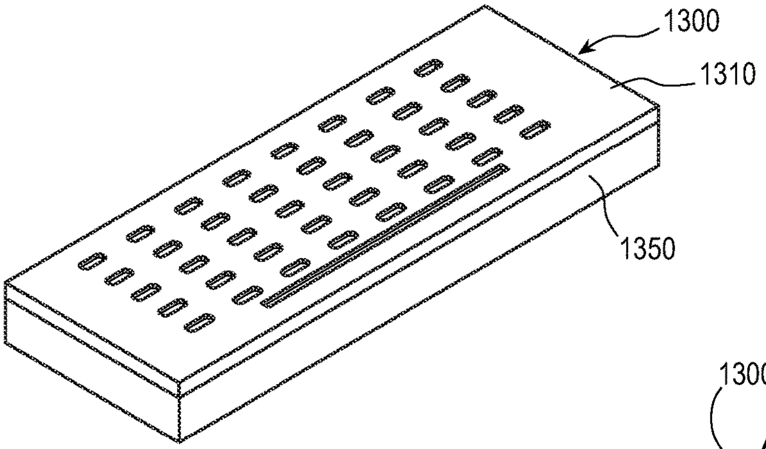
FIG. 13A is an upper perspective view of still another antenna assembly.
Figure 13B:
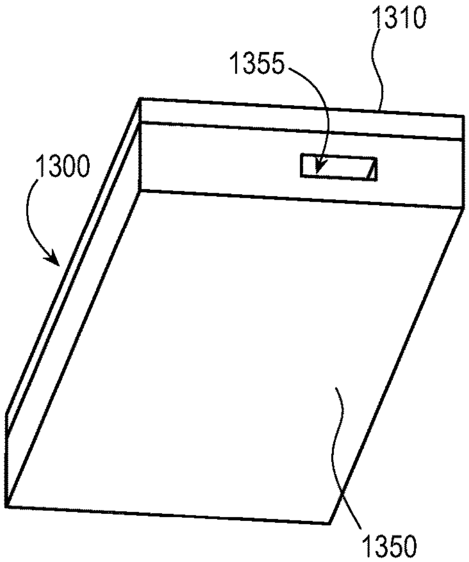
FIG. 13B is a lower perspective view of the antenna assembly of FIG. 13A.
Figure 13C:
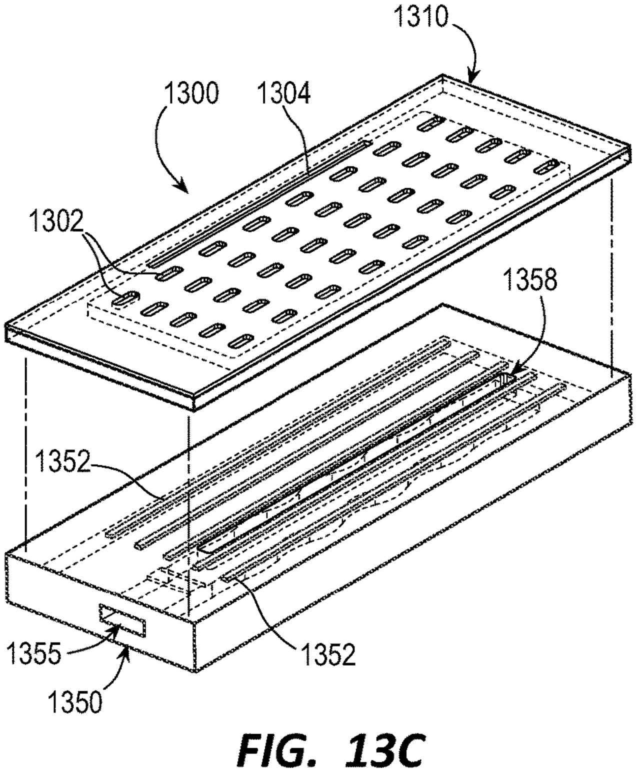
FIG. 13C is an upper, exploded, perspective view of the antenna assembly of FIGS. 13A and 13B.
Figure 13D:
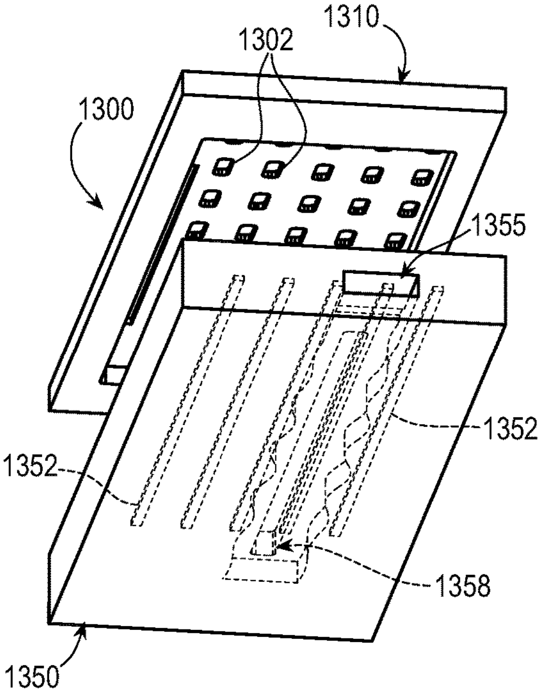
FIG. 13D is a lower, exploded, perspective view of the antenna assembly of FIGS. 13A-13C.

Yet another example of an antenna assembly 1200 is depicted in FIGS. 12A-12C. Antenna assembly 1200 again comprises an antenna body 1250, a cover plate 1210 defining a parallel plate waveguide therebetween, and a sidewall piece 1240 positioned therebetween to define sidewalls for the parallel plate waveguide. Antenna assembly further comprises a bottom cap or plate 1270. Thus, it should be understood that waveguide 1255 in antenna body 1250 may be wholly self-contained therein, as previously described, or may be defined by two layers as shown in FIGS. 12A and 12B.

As shown in FIG. 12C, cover plate 1210 again comprises an array of elongated, radiating slots 1202 arranged in columns that are non-staggered. Because antenna assembly 1200 lacks vertical (and horizontal) protrusions, only the lower side of the various layers of the assembly are depicted in FIG. 12C.

Antenna body 1250 again comprises an elongated slot or tunnel defining a waveguide 1255 therein. Waveguide 1255 is "wavy" or meandering, as previously described. However, unlike previously depicted embodiments, waveguide 1255 is positioned along a central portion of antenna body 1250. Antenna assembly 1200 can therefore be considered a "boresight" antenna assembly. In other words, unlike the previous embodiments, antenna assembly 1200 is not specifically configured to provide a squinted beam.

A straight feed slot 1258 extends along a central region of the waveguide 1255. As previously mentioned, this feed slot 1258 allows electromagnetic energy to be injected into the parallel plate waveguide formed by antenna body 1250, cover 1210, and sidewall piece 1240.

Another antenna assembly 1300 is depicted in FIGS. 13A-13D. Antenna assembly 1300 again comprises an antenna body 1350 and a cover plate 1310 defining a parallel plate waveguide therebetween. However, instead of providing a separate sidewall piece/layer, sidewalls for the parallel plate waveguide extend from the peripheral edge of cover plate 1310.

As shown in FIG. 13B, cover plate 1310 again comprises an array of elongated, radiating slots 1302 arranged in columns that are non-staggered. Unlike any of the previous embodiments, cover plate 1310 further comprises a single, elongated slot 1304 extending along one side of the array of smaller slots 1302. Without being limited by theory, it is thought that this longer slot 1304 provides another degree of freedom to shape the beam pattern and reduce unwanted radiation. It is believed that slot 1304 operates at a different frequency and may serve to cancel unwanted grating lobes at desired angles and thus may reduce coupling to adjacent antennas. The position, size, and placement of this longer slot 1304 will vary depending on the application and desired characteristics of the radiation pattern. It is also contemplated that slot 1304 may, in alternative embodiments, be divided into a plurality of smaller slots extending along a line or, of course, omitted altogether. It is contemplated that, in such embodiments, each of the plurality of smaller slots may be substantially longer than the slots 1302 of the array of radiating slots.

Antenna body 1350 again comprises an elongated slot or tunnel defining a waveguide 1355 therein. Waveguide 1355 is "wavy" or meandering, as previously described. Waveguide 1355 is also positioned shifted away from a center of antenna body 1350. However, due to the presence of various features described herein, antenna assembly 1300 can be considered a "squinted" antenna assembly. In other words, antenna assembly 1300 is configured to provide a squinted beam and various parameters of its features can be used to direct the squinted beam as desired.

A straight feed slot 1358 extends along or near a central region of the waveguide 1355. As previously mentioned, this feed slot 1358 allows electromagnetic energy to be injected into the parallel plate waveguide.

Notably, antenna assembly 1300 provides another unique feature in the form of a series of protruding ridges 1352 that are formed in straight lines in an array along the surface of antenna body 1350 forming the parallel plate waveguide. These ridges 1352 may provide an effect similar, but not identical, to that of the vertical protrusions described above in connection with several embodiments. It is thought that ridges 1352 may follow the electric field distribution inside the cavity of the parallel plate waveguide. Ridges 1352 may therefore be used as an additional parameter for reduction of grating lobes, if desired.

Figure 14A:
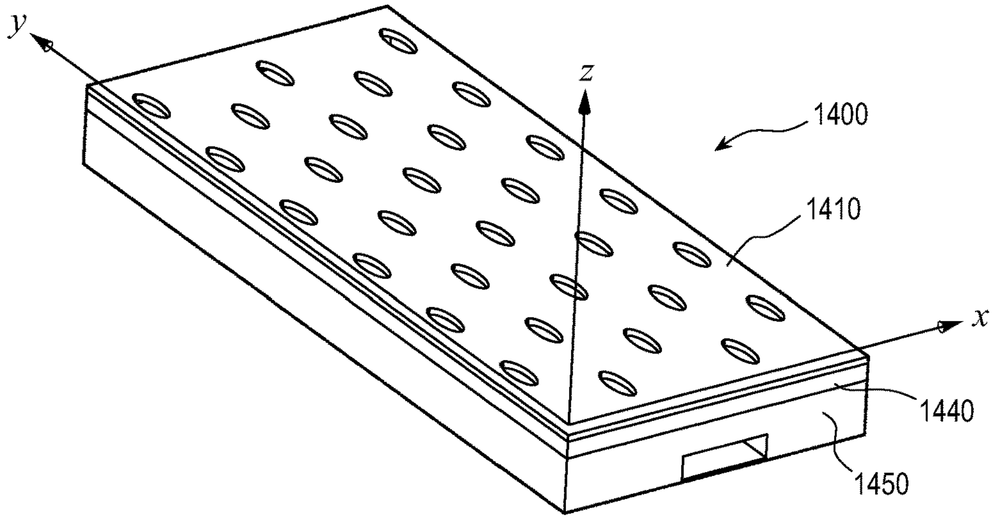
FIG. 14A is a perspective view of an antenna assembly according to still other embodiments.
Figure 14B:
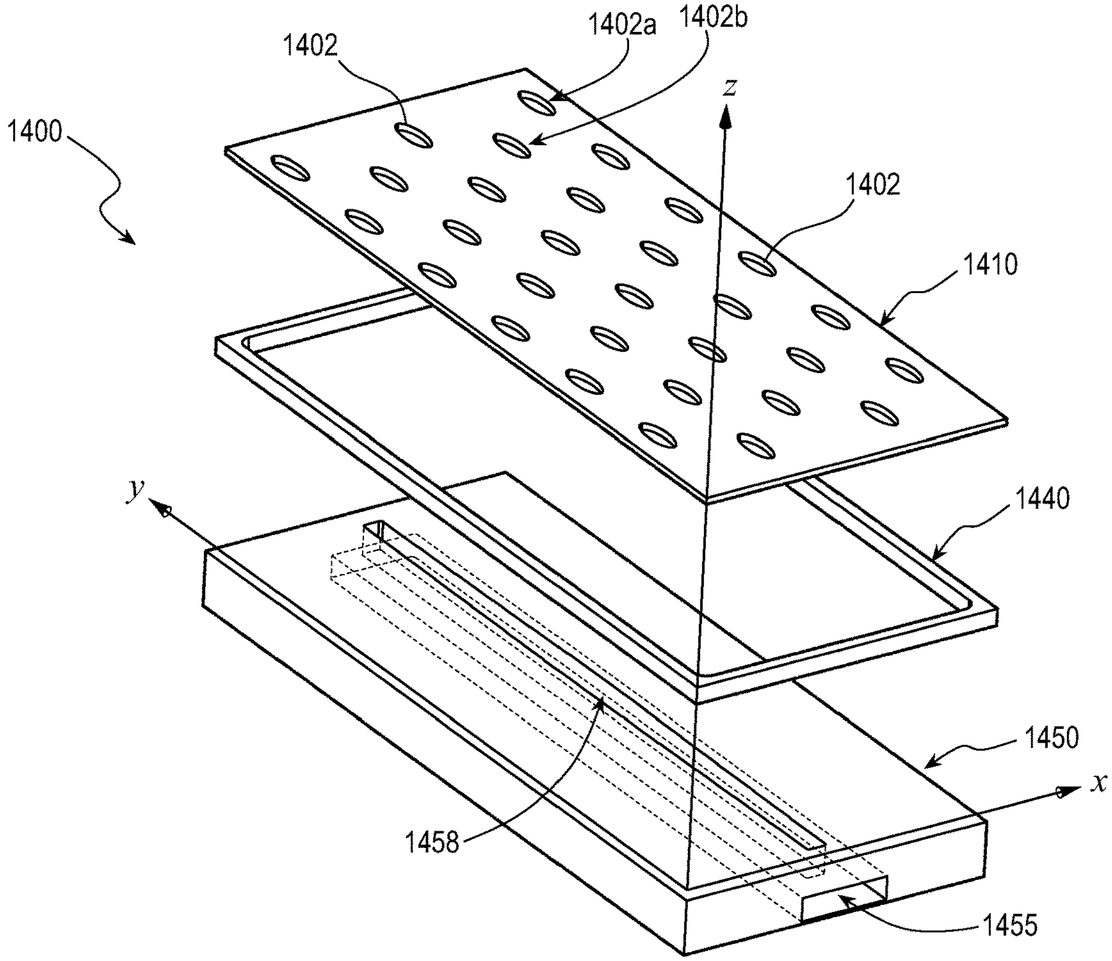
FIG. 14B is an exploded, perspective view of the antenna assembly of FIG. 14A.

Yet another antenna assembly 1400 is depicted in FIGS. 14A and 14B. Antenna assembly 1400 comprises three layers, namely, an antenna body 1450, a sidewall piece 1440, and a cover plate 1410.

There are a few notable aspects of this embodiment that are worth pointing out. First, cover plate 1410 again comprises an array of elongated, radiating slots 1402 arranged in staggered columns 1402*a*, 1402*b*, etc. However, slots 1402 are oval or elliptical in shape, which differs from the more rectangular slots with rounded corners (they need not be rounded in all contemplated embodiments) of the previous embodiments. In addition, antenna body 1450 again comprises an elongated slot or tunnel defining a waveguide 1455 therein. Waveguide 1455 is also positioned along a center of antenna body 1450 and should be considered a "boresight" embodiment of the invention, as previously described. A straight feed slot 1458 extends along or near a central region of the waveguide 1455 to facilitate injection of electromagnetic energy into the parallel plate waveguide.

Figure 15A:
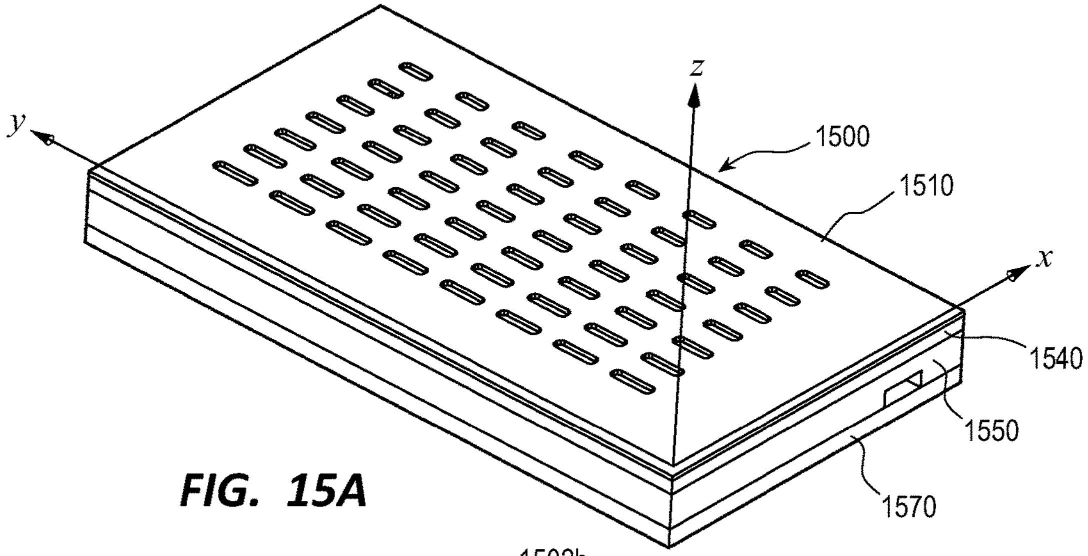
FIG. 15A is a perspective view of an antenna assembly according to still further embodiments.
Figure 15B:
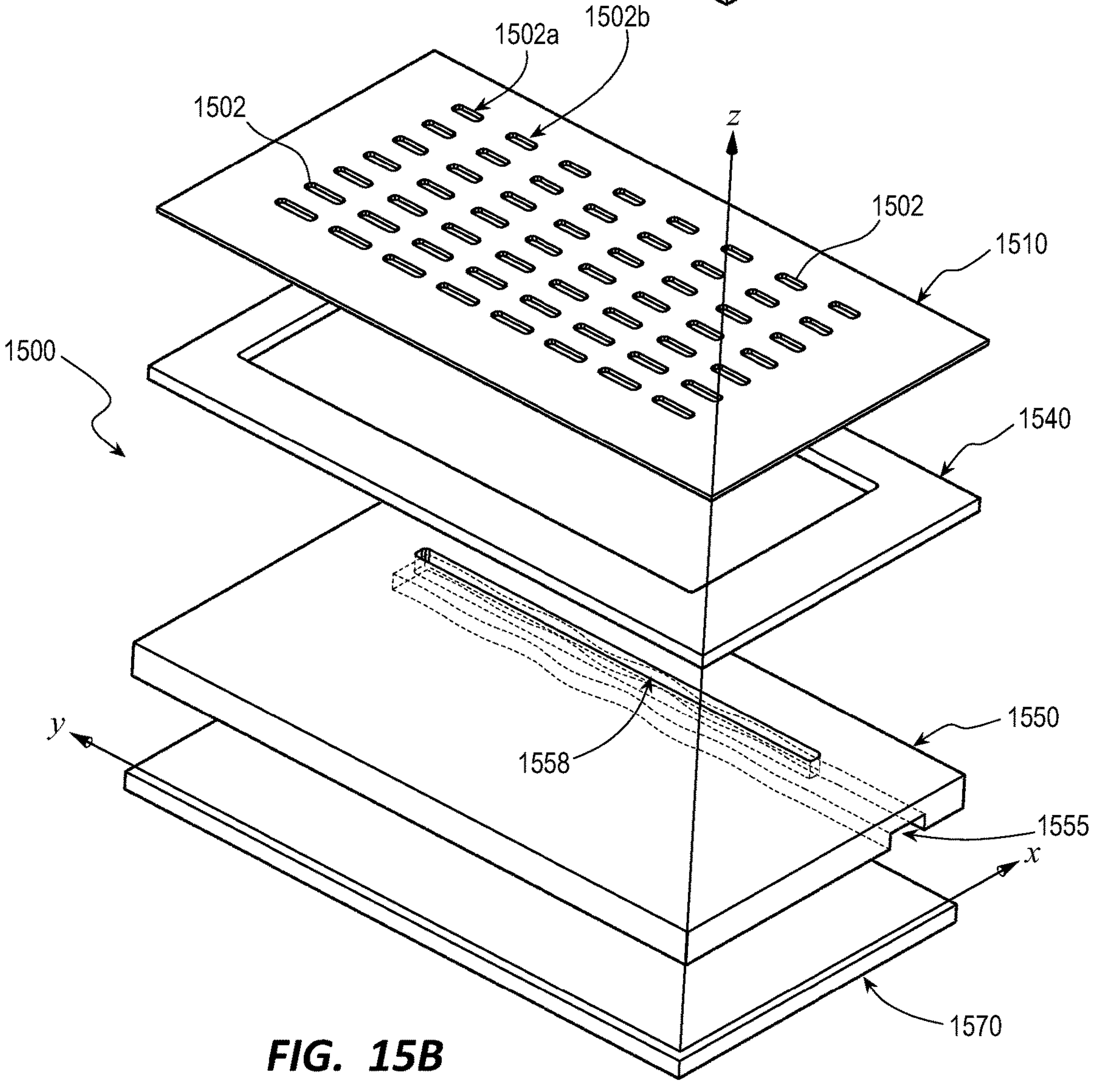
FIG. 15B is an exploded, perspective view of the antenna assembly of FIG. 15A.

Another embodiment of an antenna assembly 1500 is depicted in FIGS. 15A and 15B. Antenna assembly 1500 comprises four layers, namely, an antenna body 1550, a cover plate 1510 defining a parallel plate waveguide therebetween, a sidewall piece 1540 defining sidewalls for the parallel plate waveguide, and a bottom plate 1570. As previously mentioned, the number of layers may vary as desired from the specific embodiment shown in these figures.

As shown in FIG. 15B, cover plate 1510 again comprises an array of elongated, radiating slots 1502 arranged in columns that are non-staggered. Unlike any of the previous embodiments, however, cover plate 1510 comprises radiating slots 1502 that increase in length from one side of cover plate 1510 to the opposite side. More particularly, slots 1502 are largest on the side closest to the side into which electromagnetic radiation is received into the parallel plate waveguide from slot 1558. The length of slots 1502 gradually increases in each row extending away from slot 1558 along the x axis. It is thought that this feature will facilitate better and more efficient control over the radiating energy across the structure because the attenuation of the electric field inside the cavity will be larger going away from the feed slot. In preferred embodiments, the length of the radiating slots 1502 may increase between about 10% and about 30% from one side to the other or, in other embodiments, between about 2% and about 15% from one side to the other, preferably although not necessarily in a gradual manner as depicted in FIG. 15B. However, this range may depend on the number of slot columns and therefore the size of the cavity/waveguide below. It is likely that the longer the cavity/waveguide or number of slot columns, the smaller the increase in length. Again, a varying length of radiating slots may be provided in any of the embodiments disclosed herein. Finally, it is worth noting that the length of radiating slots 1502 may vary along the y direction as well (for example, decreasing or increasing going away from the geometrical center of the array of radiating slots).

Antenna body 1550 again comprises an elongated slot or tunnel defining a waveguide 1555 therein. Waveguide 1555 is "wavy" or meandering, as previously described and extends adjacent to a sidewall of antenna body 1550. Antenna assembly 1500 should be considered a "squinted" antenna assembly configured to provide a squinted beam and various parameters of its features can be used to direct the squinted beam as desired. A straight feed slot 1558 extends along or near a central region of the waveguide 1555 for introduction of electromagnetic energy into the parallel plate waveguide.

Figure 16A:
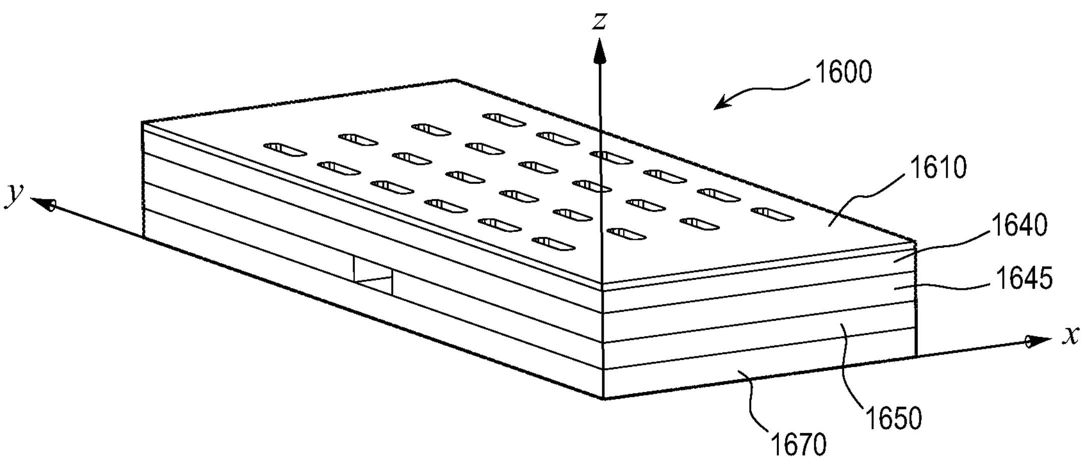
FIG. 16A is a perspective view of an antenna assembly comprising a center-fed waveguide according to additional embodiments.
Figure 16B:
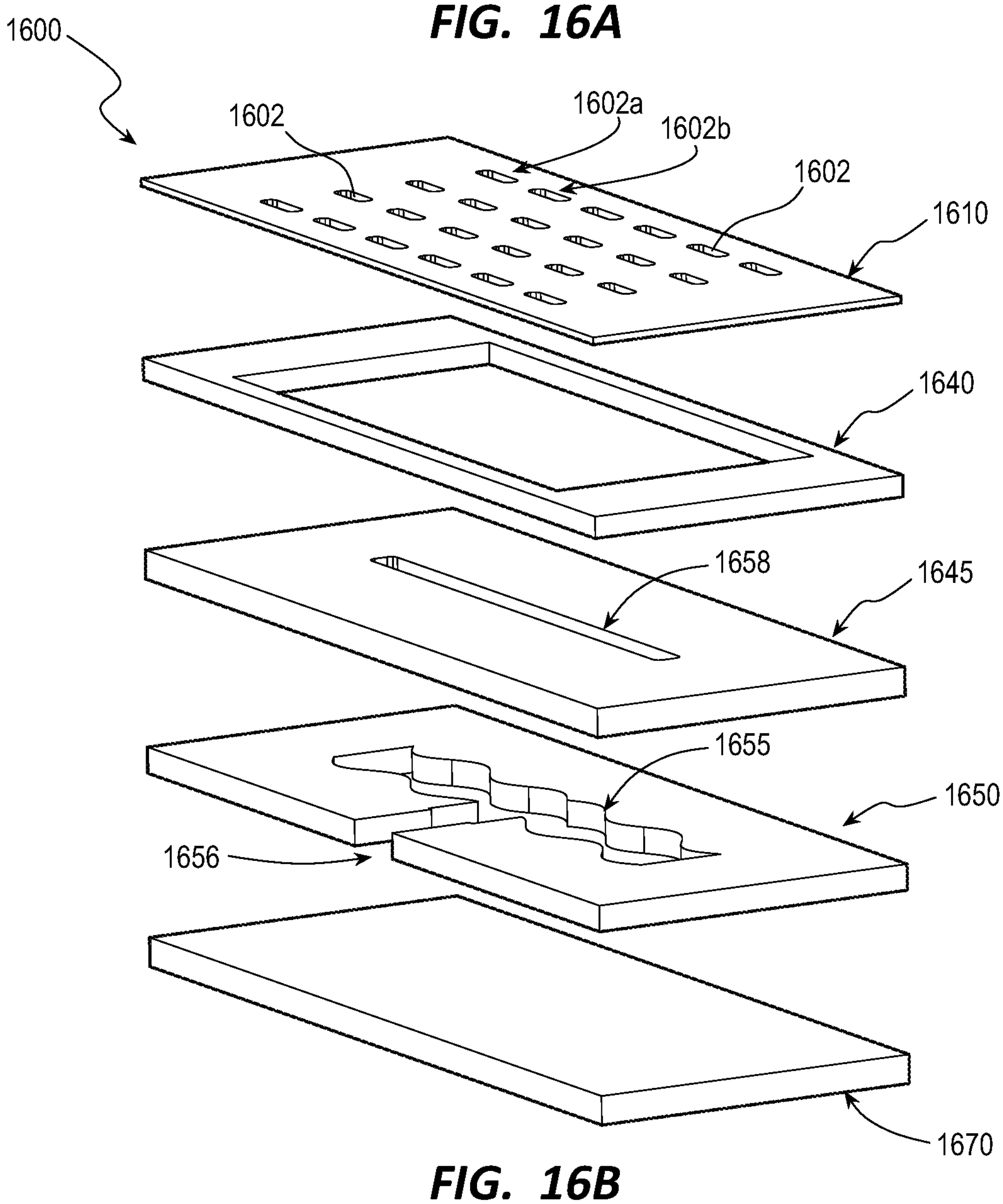
FIG. 16B is an exploded, perspective view of the antenna assembly of FIG. 16A.

Yet another embodiment of an antenna assembly 1600 is depicted in FIGS. 16A and 16B. Antenna assembly 1600 comprises five layers, namely, an open-ended antenna body 1650 defining a wavy feed waveguide 1658, a feed slot layer 1645 defining a straight feed slot 1658 configured to receive from and/or deliver electromagnetic energy to feed waveguide 1658, a cover plate 1610 defining an array of radiating slots 1602 and partially defining a parallel plate waveguide, a sidewall piece 1640 defining sidewalls for the parallel plate waveguide, and a bottom plate 1670. As previously mentioned, the number of layers may vary as desired from the specific embodiment shown in these figures.

As shown in FIG. 16B, cover plate 1610 again comprises an array of elongated, radiating slots 1602 arranged in columns 1602*a*, 1602*b*, etc., that are non-staggered. As mentioned throughout this disclosure, alternative embodiments are contemplated in which the radiating slots 1602 may be formed in staggered columns and/or rows instead.

Two additional aspects of assembly 1600 are worth noting. First, unlike previous embodiments, assembly 1600 comprises a "center-fed" feed waveguide 1658. In other words, waveguide 1658 is fed at or near the center of the waveguide by way of feed opening 1656 rather than at the end, as with previous embodiments. This feeding configuration is preferably at, or at least substantially at, the phase center of the antenna, which may ensure or at least facilitate practically, boresight radiation.

The center-feeding mechanism of the antenna of FIG. 16B can facilitate distribution of the power into two sides, right and left. The electromagnetic waves therefore travel half of the distance compared to the edge- or end-fed embodiments previously depicted. The EM fields therefore attenuate less and hence provide more efficient excitement of the slots. The edge-fed antenna is also more dispersive, and this can be seen from the elevation pattern (y axis on the figures), which squints with frequency. Center-fed embodiments are therefore more broadband.

Another potential benefit or difference from the edge-fed waveguide antennas is that center-fed embodiments may have a different flexibility in terms of placement or positioning in a MIMO array configuration.

As shown in FIG. 16B, preferably the feed opening/junction 1656 extends into the feed waveguide 1655 at a perpendicular angle, although it is contemplated that the angle need not be precisely perpendicular and therefore preferred embodiments may comprise a feed junction that is at least substantially perpendicular to the feed waveguide.

It is also worth noting that assembly 1600 comprises a separate layer 1645 within which the feed slot 1658 into the parallel plate waveguide is formed. Of course, this feature may be applied to any of the previous embodiments. Similarly, in an alternative embodiment to the specific embodiment depicted in FIGS. 16A and 16B, a center-fed waveguide may alternatively be formed in the same layer/structure as slot 1658.

FIGS. 17A-17I illustrate a variety of possible alternative configurations for radiating slots and/or vertical protrusions (although only radiating slots are depicted in these figures, it is contemplated that any of these configurations may also, or alternatively, be applied to the vertical protrusions mentioned throughout this disclosure). These configurations may result in angling of the primary/elongated axis of the slots/protrusions relative to the underlying feed slot(s) (not shown in these figures). These array configurations may be used to provide an additional degree of freedom and/or to reduce side lobes.

Figure 17A:
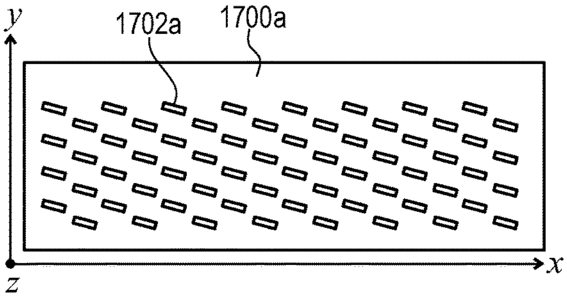
FIGS. 17A-17I are top plan views of various antennae illustrating a variety of possible configurations for radiating slots.

FIG. 17A depicts an upper plan view of an antenna 1700*a* comprising an array of radiating slots 1702*a*, each of which is angled relative to the antenna structure within which they are formed and/or the underlying feed slot or slots, as previously mentioned. In some embodiments, this angle may be between about five degrees and about fifteen degrees. The radiating slots 1702*a* may also be formed in staggered columns, as shown in the figure, or non-staggered columns.

Figure 17B:
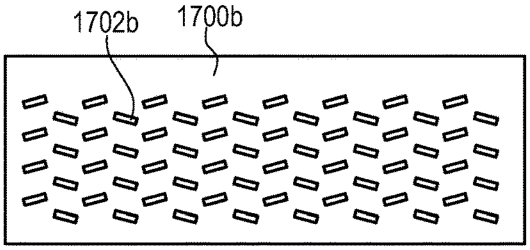

FIG. 17B depicts an upper plan view of another antenna 1700*b* comprising an array of radiating slots 1702*b* arranged in columns, each of which is angled in an opposite direction relative to the adjacent columns. Preferably, the angle of rotation of one row relative to the antenna structure within which they are formed and/or the underlying feed slot or slots is the same, or at least substantially the same, as the opposite angle of rotation of the adjacent column or columns.

Figure 17C:
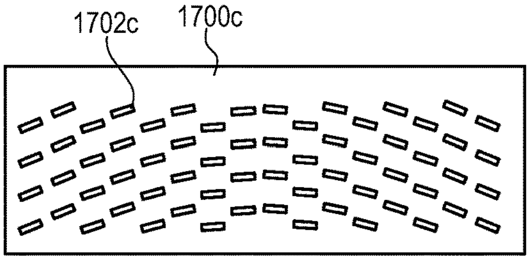

FIG. 17C depicts an upper plan view of still another antenna 1700*c* comprising an array of radiating slots 1702*c* arranged in columns, each of which is angled gradually in the same direction relative to an adjacent column of slots 1702*c* in the same direction. In some embodiments, an incremental angle of rotation may be used such that each column of slots 1702*c* is rotated by the same angle, or at least substantially the same angle, relative to an adjacent column in the same direction along the array.

Figure 17D:
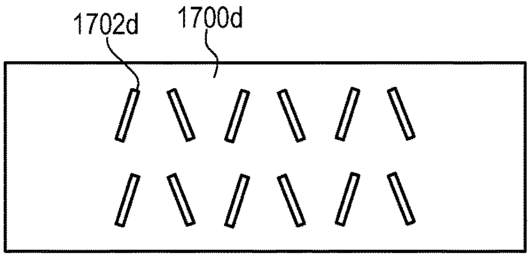

FIG. 17D depicts an upper plan view of yet another antenna 1700*d* comprising an array of radiating slots 1702*d* arranged in columns that are rotated in one direction, and then back in the other direction, as the array proceeds from one column to the next. In the depicted embodiment, the slots 1702*d* are arranged in columns or pairs that repeat in every other column. However, this need not be the case in all embodiments. For example, the slots 1702*d* may rotate gradually in one direction in a plurality of steps and then back in the opposite direction, if desired.

Figure 17E:
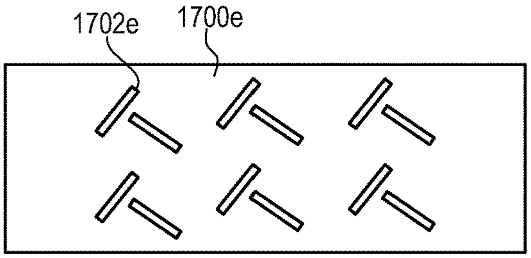

FIG. 17E depicts an upper plan view of yet another antenna 1700*e* comprising an array of radiating slots 1702*e* arranged in pairs that are positioned perpendicular to one another and both of which are angled relative to the antenna structure within which they are formed and/or the underlying feed slot or slots. Of course, it is contemplated that in some embodiments the angle need not be precisely perpendicular. Rather, the angle may be at least substantially perpendicular, or non-perpendicular.

Figure 17F:
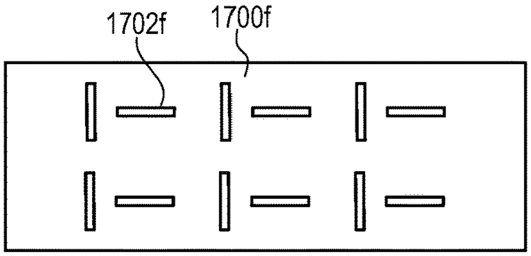

FIG. 17F depicts an upper plan view of yet another antenna 1700*f* comprising an array of radiating slots 1702*f* arranged in columns that are perpendicular, or at least substantially perpendicular, to one another. In addition, and unlike antenna 1700*e*, however, one set of columns of slots 1702*f* are also aligned with, or at least substantially aligned with, the antenna structure within which they are formed and/or the underlying feed slot or slots, and the other set of columns of slots 1702*f* are perpendicular, or at least substantially perpendicular, to one or both of these structures.

Figure 17G:
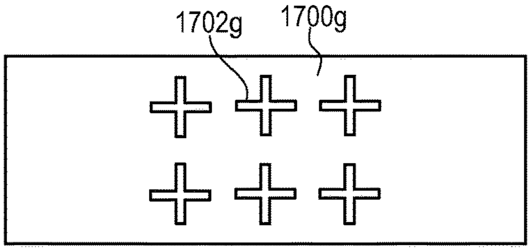

FIG. 17G depicts an antenna 1700*g* comprising radiating slots 1702*g* formed with intersecting slot portions formed into the shape of a plus sign. Although these slot portions are perpendicular to one another in the depicted embodiment, in alternative embodiments they may extend at non-perpendicular angles to one another.

Figure 17H:
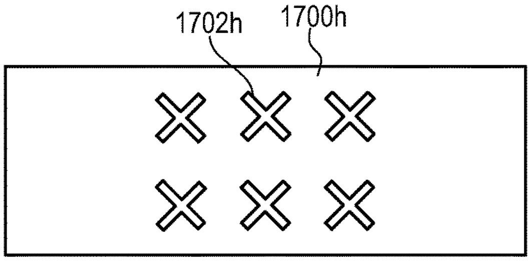

FIG. 17H also depicts an antenna 1700*h* comprising radiating slots 1702*h* formed with intersecting slot portions formed into the shape of a plus sign. However, unlike antenna 1700g, these slot portions extend at acute angles relative to the antenna structure within which they are formed and/or the underlying feed slot or slots.

Figure 17I:
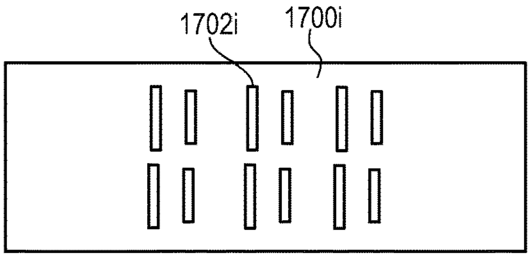
Figure 18A:
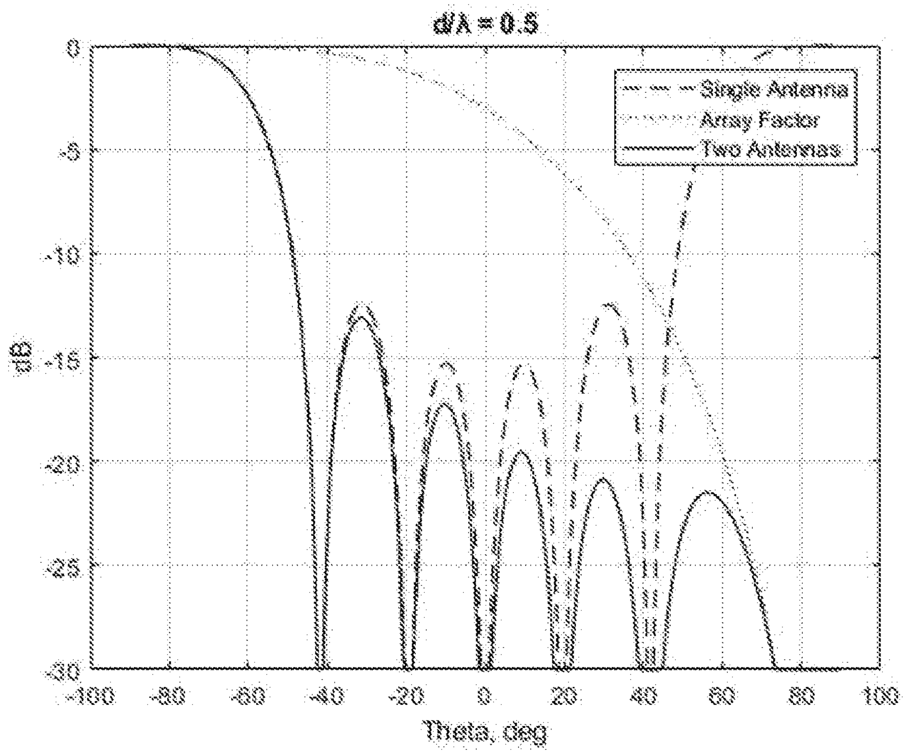
FIGS. 18A-18D are graphs illustrating the results of calculations based on the simplified model shown in FIG. 5.
Figure 18B:
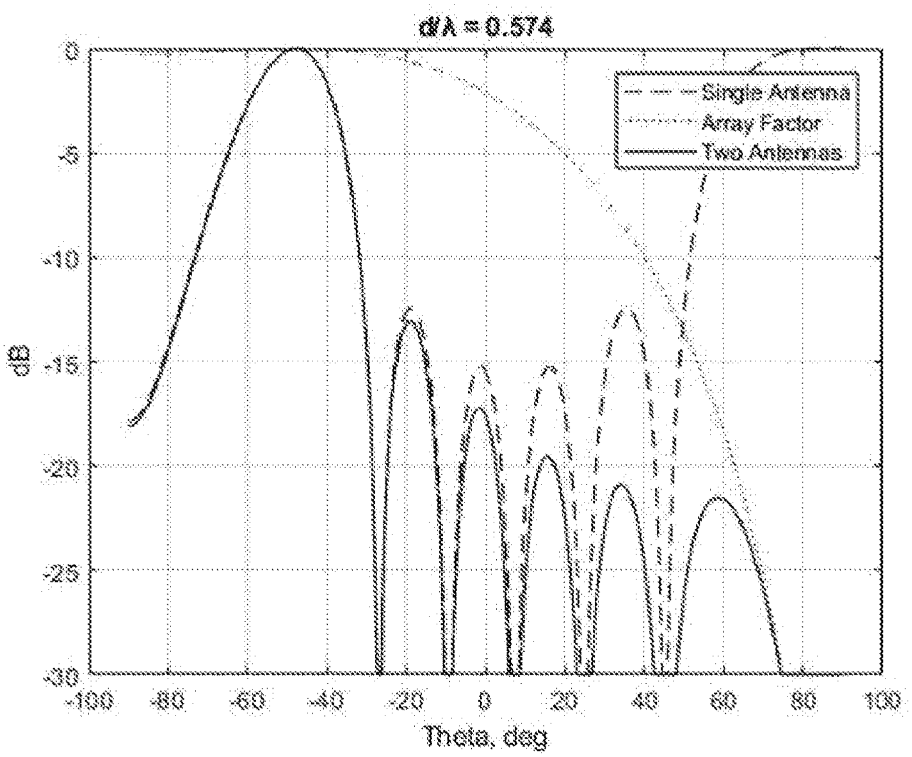
Figure 18C:
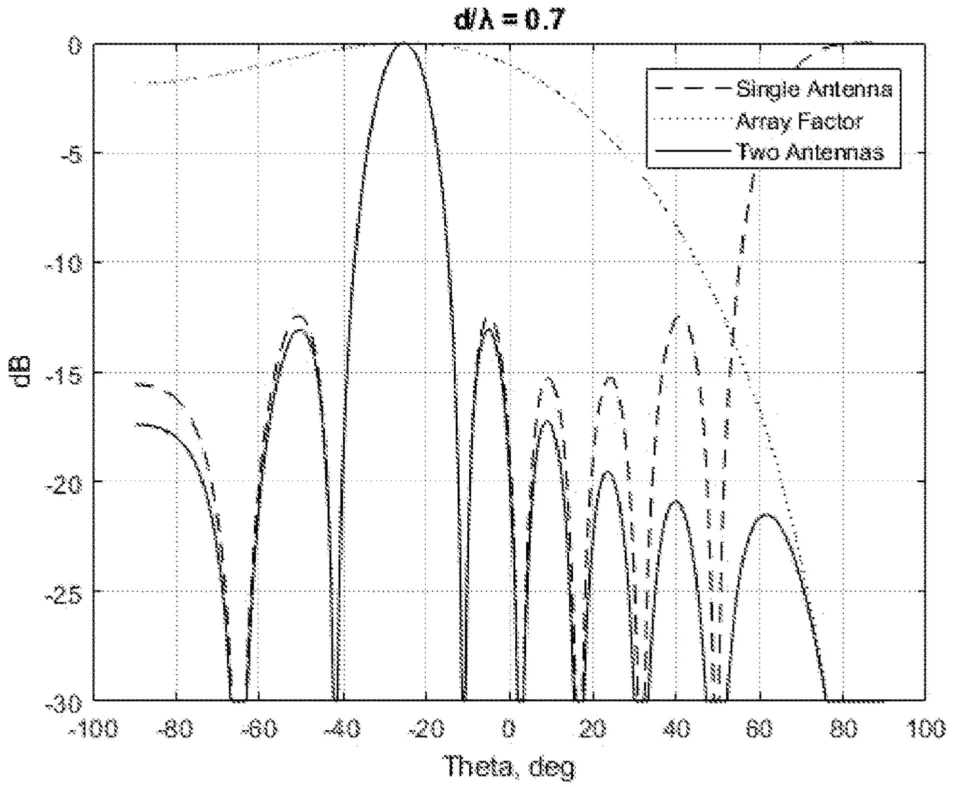
Figure 18D:
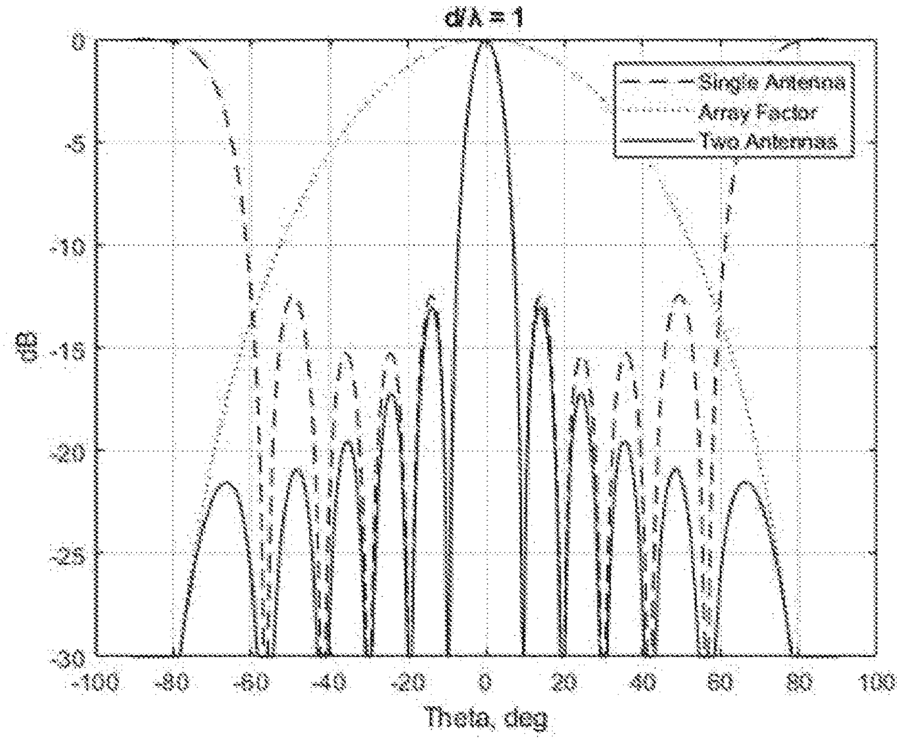

Finally, FIG. 17I depicts an antenna 1700i comprising radiating slots 1702i formed in pairs or columns in which each slot 1702i of one column is of a different length than the slots 1702i of the adjacent column or columns. In addition, slots 1702i are formed perpendicular (but may be substantially perpendicular in other embodiments) to the antenna structure within which they are formed and/or the underlying feed slot or slots.

It should also be understood that, although the radiating slots of the embodiments of FIGS. 17A-17I are shown in the form of rectangular-shaped slots, any of these slots, or any of the slots of any of the other embodiments disclosed herein, may instead be of another shape, such as circular, oval, or elliptical, for example.

FIGS. 18A-18D are graphs illustrating the results of calculations based on the simplified model shown in FIG. 5. These graphs illustrate grating lobe suppression for various directions of the main lobe of a radiation pattern. More particularly, these figures illustrate the behavior of functions: F1—Single Antenna, i.e., a single column; AF—Array Factor; and F2—Two Antennas, i.e., the two columns. Each function is expressed in dB and normalized to its maximum.

These figures further illustrate that with $d/\lambda_0=0.5$ the main lobe is pointing in the direction close to −90 degrees—"end fire" case. Similarly, with $d/\lambda_0=0.574$ the main lobe is pointing at ~−45 degrees; with $d/\lambda_0=0.7$, at ~−25 degrees; and with $d/\lambda_0=1$ at ~0 degrees.

The latter case ($d/\lambda_0=1$ with the main lobe pointing at ~0 degrees, i.e., the boresight case), is a special case of the squint antenna. In all cases shown in FIGS. 16A-16D, the grating lobe is deeply suppressed by the array factor AF.

However, it should be noted that the model of FIG. 5 is simplified and does not consider: the boundary conditions at the inner surface of the sidewalls, the impact of the vertical protrusions, the sizes of the radiating slots, and the radiation losses in the parallel-plate waveguide. It illustrates the mechanism of the squint control of the main beam and suppression of the grating lobe.

As those of ordinary skill in the art will appreciate, antenna/waveguide/sensor assemblies incorporating the structures described herein may further comprise a PCB or other electromagnetic-generating element from which electromagnetic waves may be generated to feed one or more waveguide structures. These elements may be provided in a separate layer or, alternatively, may be provided in the same layer.

It should also be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An antenna assembly, comprising:

a plurality of radiating slots formed in a first array comprising a plurality of columns; and a plurality of protrusions formed in a second array comprising a plurality of columns, wherein each radiating slot of the plurality of radiating slots is positioned adjacent to and is functionally correlated with a single corresponding protrusion from the plurality of protrusions, wherein each of the plurality of columns of radiating slots is shifted relative to an adjacent column of radiating slots, and wherein each of the plurality of columns of protrusions is shifted relative to an adjacent column of protrusions.

2. The antenna assembly of claim 1, wherein the number of radiating slots in the first array is equal to the number of protrusions in the second array.

3. The antenna assembly of claim 1, wherein each of the plurality of columns of radiating slots is shifted relative to an adjacent column of radiating slots in a staggered configuration such that every other column of radiating slots is arranged in an aligned and non-shifted configuration, and wherein each of the plurality of columns of protrusions is shifted relative to an adjacent column of protrusions in a staggered configuration such that every other column of protrusions is arranged in an aligned and non-shifted configuration.

4. The antenna assembly of claim 1, wherein each of the plurality of protrusions is formed on a surface defining, at least in part, a parallel plate waveguide.

5. The antenna assembly of claim 1, wherein each of the plurality of protrusions is elongated, and wherein each of the plurality of radiating slots is elongated in a shape at least substantially matching a cross-sectional shape of each of the plurality of protrusions.

6. The antenna assembly of claim 1, wherein each of the plurality of radiating slots is aligned with and positioned directly above a corresponding protrusion from the plurality of protrusions.

7. The antenna assembly of claim 1, wherein each of the plurality of radiating slots is positioned above a corresponding protrusion from the plurality of protrusions but is shifted by a distance of no more than about 0.5 mm relative to the corresponding protrusion.

8. An antenna assembly, comprising:

a plurality of elongated radiating slots formed in a first array, wherein each elongated radiating slot of the plurality of elongated radiating slots extends at least substantially parallel to each another within the first array;

a plurality of elongated protrusions formed in a second array, wherein each elongated protrusion of the plurality of elongated protrusions extends at least substantially parallel to each another within the second array, and wherein each radiating slot within the first array extends at least substantially parallel to each elongated protrusion within the second array.

9. The antenna assembly of claim 8, wherein the first array comprises a plurality of columns, wherein the second array comprises a plurality of columns, and wherein the number of columns in the first array matches the number of columns in the second array.

10. The antenna assembly of claim 9, wherein the number of elongated protrusions matches the number of elongated radiating slots.

11. The antenna assembly of claim 8, wherein each of the plurality of elongated protrusions is positioned below a corresponding radiating slot of the plurality of elongated radiating slots.

12. The antenna assembly of claim 11, wherein each of the plurality of elongated protrusions comprises an at least substantially identical length and width relative to its corresponding radiating slot.

13. A vehicle sensor assembly, comprising:

a waveguide, comprising a first array defined by a plurality of protrusions, wherein the first array comprises a first column of protrusions and a second column of protrusions positioned adjacent to the first column, and wherein protrusions in the first column of the first array are shifted relative to protrusions in the second column of the first array such that protrusions in the first column are misaligned with protrusions in the second column; and a plurality of radiating slots arranged in a second array and configured to receive electromagnetic radiation into and/or deliver electromagnetic radiation out of the waveguide, wherein the second array comprises a first column of radiating slots and a second column of radiating slots positioned adjacent to the first column, and wherein radiating slots in the first column of the second array are shifted relative to radiating slots in the second column of the second array such that radiating slots in the first column are misaligned with radiating slots in the second column.

14. The vehicle sensor assembly of claim 13, wherein a number of columns of the plurality of elongated protrusions is equal to a number of columns of the plurality of radiating slots.

15. The vehicle sensor assembly of claim 14, wherein a number of radiating slots of the plurality of radiating slots is equal to a number of protrusions of the plurality of protrusions.

16. The vehicle sensor assembly of claim 15, wherein each protrusion in the first array is aligned with and positioned directly below a corresponding radiating slot in the second array.

17. The vehicle sensor assembly of claim 13, wherein the first array comprises a third column of protrusions, wherein protrusions in the third column are shifted relative to protrusions in the second column such that protrusions in the first column are aligned with protrusions in the third column.

18. The vehicle sensor assembly of claim 17, wherein each of the plurality of protrusions comprises an elongated protrusion, wherein each axis of each of the plurality of protrusions is parallel to one another, and wherein each of at least a subset of protrusions in the first column is aligned with a space between two adjacent protrusions in the second column.

19. The vehicle sensor assembly of claim 13, further comprising a second waveguide, wherein the second waveguide comprises a feed waveguide configured to feed the waveguide, and wherein the waveguide comprises a parallel plate waveguide.

* * * * *